(12) United States Patent
Hoffman et al.

(10) Patent No.: US 10,561,065 B2
(45) Date of Patent: Feb. 18, 2020

(54) HYDRAULICALLY CONTROLLED FLIP UP MOWER DECK

(71) Applicant: Venture Products, Inc., Orrville, OH (US)

(72) Inventors: Michael S. Hoffman, Greenwich, OH (US); Jeff C. Liggett, North Lawrence, OH (US); Roscoe J. Lehman, Dalton, OH (US)

(73) Assignee: Venture Products, Inc., Orrville, OH (US)

( * ) Notice: Subject to any disclaimer, the term of this patent is extended or adjusted under 35 U.S.C. 154(b) by 196 days.

(21) Appl. No.: 15/803,161

(22) Filed: Nov. 3, 2017

(65) Prior Publication Data

US 2019/0133035 A1    May 9, 2019

(51) Int. Cl.
*A01D 34/00*    (2006.01)
*A01D 34/64*    (2006.01)

(52) U.S. Cl.
CPC ........ *A01D 34/64* (2013.01); *A01D 2034/645* (2013.01)

(58) Field of Classification Search
CPC ....... A01D 34/74; A01D 34/662; A01D 34/64
USPC ...................................... 56/14.7, 14.9, 15.9
See application file for complete search history.

(56) References Cited

U.S. PATENT DOCUMENTS

| | | |
|---|---|---|
| 4,563,019 A | 1/1986 | Kuhn et al. |
| 4,660,654 A | 4/1987 | Wiebe et al. |
| 4,742,671 A | 5/1988 | Bich |
| 4,760,686 A | 8/1988 | Samejima et al. |
| 4,779,406 A | 10/1988 | Schroeder |
| 4,829,754 A | 5/1989 | Shimamura et al. |
| 4,997,333 A | 3/1991 | Ball et al. |
| 5,069,022 A | 12/1991 | Vandermark |
| 5,079,907 A | 1/1992 | Sameshima et al. |
| 5,459,984 A | 10/1995 | Reichen et al. |
| 5,465,564 A | 11/1995 | Koehn et al. |
| 5,475,971 A | 12/1995 | Good et al. |
| 5,515,669 A | 5/1996 | Schick et al. |
| 5,528,886 A | 6/1996 | Esau |
| 5,816,035 A | 10/1998 | Schick |
| 5,927,055 A | 7/1999 | Ferree et al. |
| 6,347,503 B1 | 2/2002 | Esau et al. |
| 6,658,831 B2 | 12/2003 | Velke et al. |
| 7,175,380 B2 * | 2/2007 | Wilson ................ A01D 34/866 414/543 |
| 7,293,398 B2 | 11/2007 | Koehn |
| 7,347,039 B2 | 3/2008 | Koehn |

(Continued)

*Primary Examiner* — Robert E Pezzuto
(74) *Attorney, Agent, or Firm* — Sand, Sebolt & Wernow Co., LPA

(57) ABSTRACT

A mower frame unit is operatively connected with a tractor device and the mower frame is moveable between a generally horizontal first position and a generally vertical second position. The mower frame is moveable from the first position to the second position via a hydraulic cylinder and piston assembly carried by the mower frame to pivot the mower frame about a transverse axis. The mower frame carries a tensioner assembly that is operatively connected to a lock assembly. The tensioner assembly serves at least two purposes. Namely, to tension a belt operatively connected to mower blade and to maintain a portion of the lock assembly in a locked manner when the tensioner assembly is in a state of tension.

18 Claims, 17 Drawing Sheets

(56) References Cited

U.S. PATENT DOCUMENTS

| | | | |
|---|---|---|---|
| 7,451,586 B1 * | 11/2008 | Papke | A01D 34/662 |
| | | | 56/15.9 |
| 7,870,710 B2 | 1/2011 | Koehn | |
| 7,870,711 B2 | 1/2011 | Koehn | |
| 2006/0010846 A1 * | 1/2006 | Koehn | A01D 34/74 |
| | | | 56/14.7 |

* cited by examiner

HYDRAULICALLY CONTROLLED FLIP UP MOWER DECK

BACKGROUND

Technical Field

The present disclosure relates generally to a mower or mower deck moveable between a generally horizontal first position to a generally vertical second position. More particularly, the present disclosure relates to a hydraulic controlled mower that pivots between the first position and the second position and method of use thereof.

Background Information

Riding tractors with attached mowers or mower decks are utilized to mow grass. The mower decks are often sized to enable significant areas of grass to be maintained via cutting/mowing. As grass is cut by the mower it may sometimes stick to the underside of the mower deck or clog a discharge chute. Accordingly, mowers are required to be cleaned. When a mower or its deck remains in a fixed position relative to generally horizontal ground it is difficult to clean the grass remnants or clogs.

SUMMARY

Issues continue to exist for mowers or mower decks. Namely, it is difficult to clean the underside of a mower deck when it is clogged with grass or otherwise needs to be serviced. The present disclosure addresses these and other issues by providing a mower that is hydraulically actuated between a generally horizontal first position and a generally vertical second position. The hydraulic mechanisms may be locked with a portion of a tensioner assembly so as to prevent in advertent retraction of a hydraulic piston.

In one aspect, an exemplary embodiment of the present disclosure may provide a mower for attachment with a tractor device, the mower comprising: a main frame carrying at least one rotatable mower cutting blade, the rotatable mower cutting blade adapted to be driven by a power unit on the tractor device; a first flange connected to the main frame; a first hitch arm pivotably connect to the first flange; a tensioner assembly connected to one of the first hitch arm or the main frame, wherein the tensioner assembly is adapted to apply tension to belts in operable communication with the at least one rotatable mower cutting blade, wherein a portion of the tensioner assembly is moveable between a tensioned first position and a relaxed second position; and a lock assembly operatively coupled to the tensioner assembly, wherein a portion of the lock assembly is moveable from a locked position to an unlocked position in response to the tensioner assembly moving from the tensioned first position to the relaxed second position. This embodiment or another exemplary embodiment may further provide wherein the locked position of the lock assembly is associated with the tensioned first position of the tensioner assembly and the unlocked position of the lock bracket is associated with the relaxed second position of the tensioner assembly. This embodiment or another exemplary embodiment may further provide a generally horizontal first position of the main frame and a generally vertical second position of the main frame; and a hydraulic piston and cylinder assembly that moves the main frame from the generally horizontal first position to the generally vertical second position. This embodiment or another exemplary embodiment may further provide a rocker arm assembly pivotably connected to the first flange along a first transverse axis and pivotably connected to a lock plate on the lock assembly along a second transverse axis, wherein the rocker arm assembly pivots about the first transverse axis and contacts the first flange on the main frame to move the main frame from the generally horizontal first position to the generally vertical second position. This embodiment or another exemplary embodiment may further provide a piston end on the hydraulic piston and cylinder assembly, wherein the piston end is pivotably coupled to the rocker arm assembly along the second transverse axis. This embodiment or another exemplary embodiment may further provide a cylinder end on the hydraulic piston and cylinder assembly, wherein the cylinder end is coupled to the first hitch arm. This embodiment or another exemplary embodiment may further provide wherein the lock plate pivots about the second transverse axis to transition the lock assembly from the locked position to the unlocked position. This embodiment or another exemplary embodiment may further provide at least one removable pin selectively connectable to a second flange and a third flange, wherein when the at least one removable pin is selectively connected with the second flange the main frame is retained in the generally horizontal first position and when the at least one removable pin is selectively connected with the third flange the main frame is retained in the generally vertical second position. This embodiment or another exemplary embodiment may further provide a lock plate on the lock assembly, the lock plate including a top surface opposite a bottom surface, wherein the bottom surface moves past a portion of a hydraulic piston and cylinder assembly in a linear manner as the main frame is hydraulically moved from a generally horizontal first position to a generally vertical second position. This embodiment or another exemplary embodiment may further provide a lock plate of the lock assembly including an end engaging an annular endwall on a hydraulic cylinder in the locked position. This embodiment or another exemplary embodiment may further provide wherein the end of the lock plate defines a minor surface of the lock plate. This embodiment or another exemplary embodiment may further provide a longitudinal pivot axis associated with the tensioner assembly, wherein a portion of the tensioner assembly pivots about the longitudinal pivot axis; a transverse pivot axis associated with the lock assembly, wherein a portion of the lock assembly pivots about the transverse pivot axis; and wherein the longitudinal pivot axis is orthogonal to the transverse pivot axis. This embodiment or another exemplary embodiment may further provide a leading edge and a trailing edge on the main frame, wherein the transverse pivot axis is intermediate the leading edge and the trailing edge. This embodiment or another exemplary embodiment may further provide a handle on the tensioner assembly; a lock plate on the lock assembly, wherein the handle engages the lock plate when the tensioner assembly is in the tensioned first position to maintain the lock plate in the locked position. This embodiment or another exemplary embodiment may further provide a spring operatively connected to the lock plate to bias the lock plate to the unlocked position as the tensioner assembly is moved from the tensioned first position. This embodiment or another exemplary embodiment may further provide a secondary extension on the tensioner assembly spaced apart parallel to the handle and extending over the lock plate in the tensioned first position. This embodiment or another exemplary embodiment may further provide a longitudinally aligned first axis, wherein the handle rotates about the first axis, and the first axis is offset from the first hitch arm. This embodiment or another exemplary embodiment may further provide a transversely aligned second axis positioned rearward from a forward end of the lock plate. This embodiment or another exemplary embodiment may further provide a transversely aligned third axis offset parallel to and positioned forwardly from the transversely aligned second axis, wherein the lock plate pivots about the transversely aligned third axis. This embodiment or another exemplary embodiment may further provide a hydraulic piston and cylinder assembly the including a piston linearly moveable between a first position and a second position, wherein the first position of the piston is associated with the locked position of the lock plate; wherein the hydraulic piston and cylinder assembly is operatively connected with the main frame so as to move the main frame from a generally horizontal position to a generally vertical position in response to moving the piston on the hydraulic piston and cylinder assembly.

In one aspect, an exemplary embodiment of the present disclosure may provide a mower for attachment with a tractor device, the mower comprising: a main frame carrying at least one rotatable mower cutting blade, the rotatable mower cutting blade adapted to be driven by a power unit on the tractor device; a first flange connected to the main frame; a first hitch arm pivotably connect to the first flange; a tensioner assembly connected to one of the first hitch arm or the main frame, wherein the tensioner assembly is adapted to apply tension to belts in operable communication with the at least one rotatable mower cutting blade, wherein a portion of the tensioner assembly is moveable between a tensioned first position and a relaxed second position; and a lock assembly operatively coupled to the tensioner assembly, wherein a portion of the lock assembly is moveable from a locked position to an unlocked position in response to the tensioner assembly moving from the tensioned first position to the relaxed second position. This embodiment or another exemplary embodiment may further provide wherein the locked position of the lock assembly is associated with the tensioned first position of the tensioner assembly and the unlocked position of the lock bracket is associated with the relaxed second position of the tensioner assembly; and wherein the lock assembly is moveable from the unlocked position to the locked position in response to the tensioner assembly moving from the relaxed second position to the tensioned first position. This embodiment or another exemplary embodiment may further provide a generally horizontal first position of the main frame and a generally vertical second position of the main frame; and a hydraulic piston and cylinder assembly that moves the main frame from the generally horizontal first position to the generally vertical second position. This embodiment or another exemplary embodiment may further provide a rocker arm assembly pivotably connected to the first flange along a first axis and pivotably connected to a lock plate along a second axis, wherein the rocker arm assembly pivots about the first axis and contacts the main frame to move the main frame from the generally horizontal first position to the generally vertical second position. This embodiment or another exemplary embodiment may further provide a piston end on the hydraulic piston and cylinder assembly, wherein the piston end is pivotably coupled to the rocker arm assembly along the second axis. This embodiment or another exemplary embodiment may further provide a cylinder end on the hydraulic piston and cylinder assembly, wherein the cylinder end is pivotably coupled to the first hitch arm. This embodiment or another exemplary embodiment may further provide wherein the lock plate moves from the locked position to the unlocked position by pivoting about the second axis. This embodiment or another exemplary embodiment may further provide at least one removable pin selectively connectable to a second flange and a third flange, wherein when the at least one removable pin is selectively connected with the second flange the main frame is retained in the generally horizontal first position and when the at least one removable pin is selectively connected with the third flange the main frame is retained in the generally vertical second position. This embodiment or another exemplary embodiment may further provide a top surface opposite a bottom surface on a lock plate of the lock assembly, wherein the bottom surface moves past a portion of a hydraulic piston and cylinder assembly in a linear manner as the main frame is hydraulically moved from a generally horizontal first position to a generally vertical second position. This embodiment or another exemplary embodiment may further provide a lock plate of the lock assembly including an end engaging an annular endwall on a hydraulic cylinder in the locked position. This embodiment or another exemplary embodiment may further provide a terminal end on the lock bracket, wherein the terminal end defines the minor surface. This embodiment or another exemplary embodiment may further provide a longitudinal first pivot axis associated with the tensioner assembly, wherein a portion of the tensioner assembly pivots about the first pivot axis; a transverse second pivot axis associated with the lock bracket, wherein the lock bracket pivots about the second pivot axis; and wherein the first axis is orthogonal to the second axis. This embodiment or another exemplary embodiment may further provide a leading edge and a trailing edge on the main frame, wherein the second pivot axis is intermediate the leading edge and the trailing edge. This embodiment or another exemplary embodiment may further provide a handle on the tensioner assembly; a lock plate on the lock assembly, wherein the handle engages the plate when the tensioner assembly is in the tensioned first position to maintain the lock plate in the locked position. This embodiment or another exemplary embodiment may further provide a spring operatively connected to the lock plate to bias the lock plate to the unlocked position as the tensioner assembly is moved from the tensioned first position. This embodiment or another exemplary embodiment may further provide a secondary extension on the tensioner assembly spaced apart parallel to the handle and extending over the lock plate in the tensioned first position. This embodiment or another exemplary embodiment may further provide a longitudinally aligned first axis, wherein the handle rotations about the first axis, and the first axis is offset from the first hitch arm. This embodiment or another exemplary embodiment may further provide a transversely aligned second axis positioned rearward from a forward end of the lock plate. This embodiment or another exemplary embodiment may further provide a transversely aligned third axis offset parallel to and positioned forwardly from the second axis, wherein the lock plate pivots about the third axis. This embodiment or another exemplary embodiment may further provide a hydraulic piston and cylinder assembly including a piston linearly moveable between an extended position and a retracted position, wherein the extended position of the piston is associated with the locked position of the lock plate.

In another aspect, an exemplary embodiment of the present disclosure may provide a method for moving a mower frame from a generally horizontal first position to a generally vertical second position comprising: moving a portion of a tensioner assembly from a tensioned first position to a relaxed second position, wherein the tensioner assembly is carried by the mower frame and is operatively connected with mower blades via at least one belt; unlocking a lock assembly directly in response to the portion of the tensioner assembly moving from the tensioned first position; rotating the mower frame about a first transverse axis to pivotably raise the mower frame from the generally horizontal first position to the generally vertical second position. This embodiment or another exemplary embodiment may further provide wherein rotating the mower frame about the first transverse axis is accomplished by actuating a hydraulic piston and cylinder assembly connected to the mower frame. This embodiment or another exemplary embodiment may further provide pivoting a portion of a rocker arm assembly about the first transverse axis, wherein the rocker arm assembly is connected to the hydraulic piston and cylinder assembly and is connected to the mower frame. This embodiment or another exemplary embodiment may further provide engaging a foot on the rocker arm assembly with the mower frame; and pivoting the foot around the first transverse axis to rotate the main frame about the transverse axis. This embodiment or another exemplary embodiment may further provide locking the mower frame in the generally vertical second position with pins selectively engaging a pin seat formed in a hitch arm pivotably connected with the mower frame at a forward end and the hitch arm connected with a tractor device at a rear end. This embodiment or another exemplary embodiment may further provide removing pins selectively connected to a flange on the mower frame prior to moving the portion of the tensioner assembly. This embodiment or another exemplary embodiment may further provide rotating a handle on the tensioner assembly about a first longitudinal axis; and releasing the handle from a direct engagement with a lock plate on the lock assembly. This embodiment or another exemplary embodiment may further provide effecting the at least one belt to be slacked in response to the handle being released from the direct engagement with the lock plate. This embodiment or another exemplary embodiment may further provide relaxing a spring in response to the handle being released from the direct engagement with the lock plate, wherein the spring is operatively connected to the handle and the at least one belt. This embodiment or another exemplary embodiment may further provide rotating a tension sheave wheel about a second longitudinal axis in response to the handle being released from the direct engagement with the lock plate, wherein the second longitudinal axis is offset parallel to the first longitudinal axis and the at least one belt extends around the tension sheave wheel. This embodiment or another exemplary embodiment may further provide releasing an end of a lock plate on the lock assembly from a direct abutment with a portion of a hydraulic cylinder. This embodiment or another exemplary embodiment may further provide urging the lock plate upwardly out of its abutment with the hydraulic cylinder; and passing the end of the lock plate over a portion of the hydraulic cylinder in response to a piston retracting into the hydraulic cylinder. This embodiment or another exemplary embodiment may further provide retracting the piston into the hydraulic cylinder to a retracted position shorter than an extended position of the hydraulic piston and cylinder assembly; and rotating an end of the piston about a second transverse axis, wherein the end of the piston is operatively connected with a rocker arm assembly. This embodiment or another exemplary embodiment may further provide rotating the rocker arm assembly around the first transverse axis in response the piston retracting relative to the hydraulic cylinder. This embodiment or another exemplary embodiment may further provide establishing a gap between an end of the lock plate and the hydraulic cylinder after moving the tensioner assembly from the tensioned first position. This embodiment or another exemplary embodiment may further provide raising the mower frame via lift arms on a tractor device prior to rotating the mower frame about the first transverse axis. This embodiment or another exemplary embodiment may further provide wherein rotating the mower about the first transverse axis occurs when an operator is located rearwardly from the mower frame. This embodiment or another exemplary embodiment may further provide raising the mower frame via hydraulics on the tractor device and rotating the mower via the hydraulic piston and cylinder assembly carried by the mower frame to effectuate the mower frame moving from the generally horizontal first position to the generally vertical second position in a hands-free manner.

In another aspect, an exemplary embodiment the present disclosure may provide a mower frame unit is operatively connected with a tractor device and the mower frame is moveable between a generally horizontal first position and a generally vertical second position. The mower frame is moveable from the first position to the second position via a hydraulic cylinder and piston assembly carried by the mower frame to pivot the mower frame about a transverse axis. The mower frame carries a tensioner assembly that is operatively connected to a lock assembly. The tensioner assembly serves at least two purposes. Namely, to tension a belt operatively connected to mower blade and to maintain a portion of the lock assembly in a locked manner when the tensioner assembly is in a state of tension.

In yet another aspect, an embodiment of the present disclosure may provide a mower for attachment with a tractor device, the mower comprising: a main frame carrying at least one rotatable mower cutting blade, the rotatable mower cutting blade adapted to be driven by a power unit on the tractor device; a first hitch arm pivotably connected to the main frame adapted to connect with the tractor device; wherein the mower frame has a generally horizontal first position of the main frame and a generally vertical second position of the main frame; and a hydraulic piston and cylinder assembly that moves the main frame from the generally horizontal first position to the generally vertical second position. This embodiment or another exemplary embodiment may further provide a tensioner assembly connected to one of the first hitch arm or the main frame, wherein the tensioner assembly is adapted to apply tension to belts in operable communication with the at least one rotatable mower cutting blade, wherein a portion of the tensioner assembly is moveable between a tensioned first position and a relaxed second position; and a lock assembly operatively coupled to the tensioner assembly, wherein a portion of the lock assembly is moveable from a locked position to an unlocked position in response to the tensioner assembly moving from the tensioned first position to the relaxed second position. This embodiment or another exemplary embodiment may further provide wherein the locked position of the lock assembly is associated with the tensioned first position of the tensioner assembly and the unlocked position of the lock bracket is associated with the relaxed second position of the tensioner assembly.

In yet another aspect, an exemplary embodiment of the present disclosure may provide a tractor frame; at least one ground engaging forward wheel coupled with the frame; at least one ground engaging rear wheel coupled with the frame; a seat adapted to support an operator; at least one lever adjacent the seat; an attachment indirectly coupled with the tractor frame and positioned forwardly from the forward wheel; a first hydraulic assembly to lift the attachment from a generally horizontal first position to a raised and tilted second position, wherein the attachment in the second position is about the ground at an angle in a range from about 5° to about 30° relative to horizontal; a second hydraulic assembly carried by the attachment to lift the attachment from the second position to a generally vertical third position, wherein the attachment in the third position is at a second angle in a range from about 70° to about 105° relative to horizontal; and wherein at least one of the first and second hydraulic assemblies moves in response to actuation of the at least one lever adjacent the seat. This embodiment or another may further provide a tensioner assembly on the attachment connected to one of a first hitch arm or the main frame of the attachment, wherein the tensioner assembly is adapted to apply tension to at least one belt, wherein a portion of the tensioner assembly is moveable between a tensioned first position and a relaxed second position; and a lock assembly operatively coupled to the tensioner assembly, wherein a portion of the lock assembly is moveable from a locked position to an unlocked position in response to the tensioner assembly moving from the tensioned first position to the relaxed second position. This embodiment or another may further provide wherein the locked position of the lock assembly is associated with the tensioned first position of the tensioner assembly and the unlocked position of the lock assembly is associated with the relaxed second position of the tensioner assembly. This embodiment or another may further provide a rocker arm assembly pivotably connected to a first flange on the main frame along a first transverse axis and pivotably connected to a lock plate on the lock assembly along a second transverse axis, wherein the rocker arm assembly pivots about the first transverse axis and contacts the first flange on the main frame to move the attachment from the second position to the third position. This embodiment or another may further provide a lock plate on the lock assembly, the lock plate including a top surface opposite a bottom surface, wherein the bottom surface moves past a portion of the second hydraulic assembly in a linear manner as the attachment is hydraulically moved from the second position to the third position.

In yet another aspect, an embodiment of the present disclosure may provide a method for moving a mower frame from a generally horizontal position to a generally vertical position comprising: actuating an element on a tractor device in hydraulic communication with a mower frame attached to the tractor device, wherein the mower frame is positioned forwardly from the tractor device; effecting hydraulic fluid to move a hydraulic piston and cylinder assembly in response to actuating the element on the tractor device; and moving the mower frame between a generally horizontal position and a generally vertical position. This embodiment or another may further provide raising the mower frame via hydraulics on the tractor device to an tilted and raised intermediate position. This embodiment or another may further provide pivoting the mower frame via the hydraulic piston and cylinder assembly carried by the mower frame to move the mower frame in a hands-free manner from the generally horizontal position to the generally vertical position, wherein actuating the element on the tractor occurs at a location near a seat. This embodiment or another may further provide moving a portion of a tensioner assembly from a tensioned first position to a relaxed second position, wherein the tensioner assembly is carried by the mower frame and is operatively connected with mower blades via at least one belt; unlocking a lock assembly directly in response to the portion of the tensioner assembly moving from the tensioned first position; and rotating the mower frame about a first transverse axis to pivotably raise the mower frame from the generally horizontal first position to the generally vertical second position. This embodiment or another may further provide wherein rotating the mower frame about the first transverse axis is accomplished by actuating a hydraulic piston and cylinder assembly connected to the mower frame. This embodiment or another may further provide pivoting a portion of a rocker arm assembly about the first transverse axis, wherein the rocker arm assembly is connected to the hydraulic piston and cylinder assembly and is connected to the mower frame. This embodiment or another may further provide engaging a foot on the rocker arm assembly with the mower frame; and pivoting the foot around the first transverse axis to rotate the main frame about the transverse axis. This embodiment or another may further provide locking the mower frame in the generally vertical position with pins selectively engaging a pin seat formed in a hitch arm pivotably connected with the mower frame at a forward end and the hitch arm connected with a tractor device at a rear end. This embodiment or another may further provide removing pins selectively connected to a flange on the mower frame prior to moving the portion of the tensioner assembly. This embodiment or another may further provide rotating a handle on the tensioner assembly about a first longitudinal axis; and releasing the handle from a direct engagement with a lock plate on the lock assembly. This embodiment or another may further provide effecting the at least one belt to be slacked in response to the handle being released from the direct engagement with the lock plate. This embodiment or another may further provide relaxing a spring in response to the handle being released from the direct engagement with the lock plate, wherein the spring is operatively connected to the handle and the at least one belt. This embodiment or another may further provide rotating a tension sheave wheel about a second longitudinal axis in response to the handle being released from the direct engagement with the lock plate, wherein the second longitudinal axis is offset parallel to the first longitudinal axis and the at least one belt extends around the tension sheave wheel. This embodiment or another may further provide releasing an end of a lock plate on the lock assembly from a direct abutment with a portion of a hydraulic cylinder. This embodiment or another may further provide urging the lock plate upwardly out of its abutment with the hydraulic cylinder; passing the end of the lock plate over a portion of the hydraulic cylinder in response to a piston retracting into the hydraulic cylinder. This embodiment or another may further provide retracting the piston into the hydraulic cylinder to a retracted position shorter than an extended position of the hydraulic piston and cylinder assembly; rotating an end of the piston about a second transverse axis, wherein the end of the piston is operatively connected with a rocker arm assembly. This embodiment or another may further provide rotating the rocker arm assembly around the first transverse axis in response the piston retracting relative to the hydraulic cylinder. This embodiment or another may further provide establishing a gap between an end of the lock plate and the hydraulic cylinder after moving the tensioner assembly from the tensioned first position. This embodiment or another may further provide raising the mower frame via lift arms on a tractor device prior to rotating the mower frame about the first transverse axis. This embodiment or another may further provide wherein rotating the mower about the first transverse axis occurs when an operator is located rearwardly from the mower frame.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
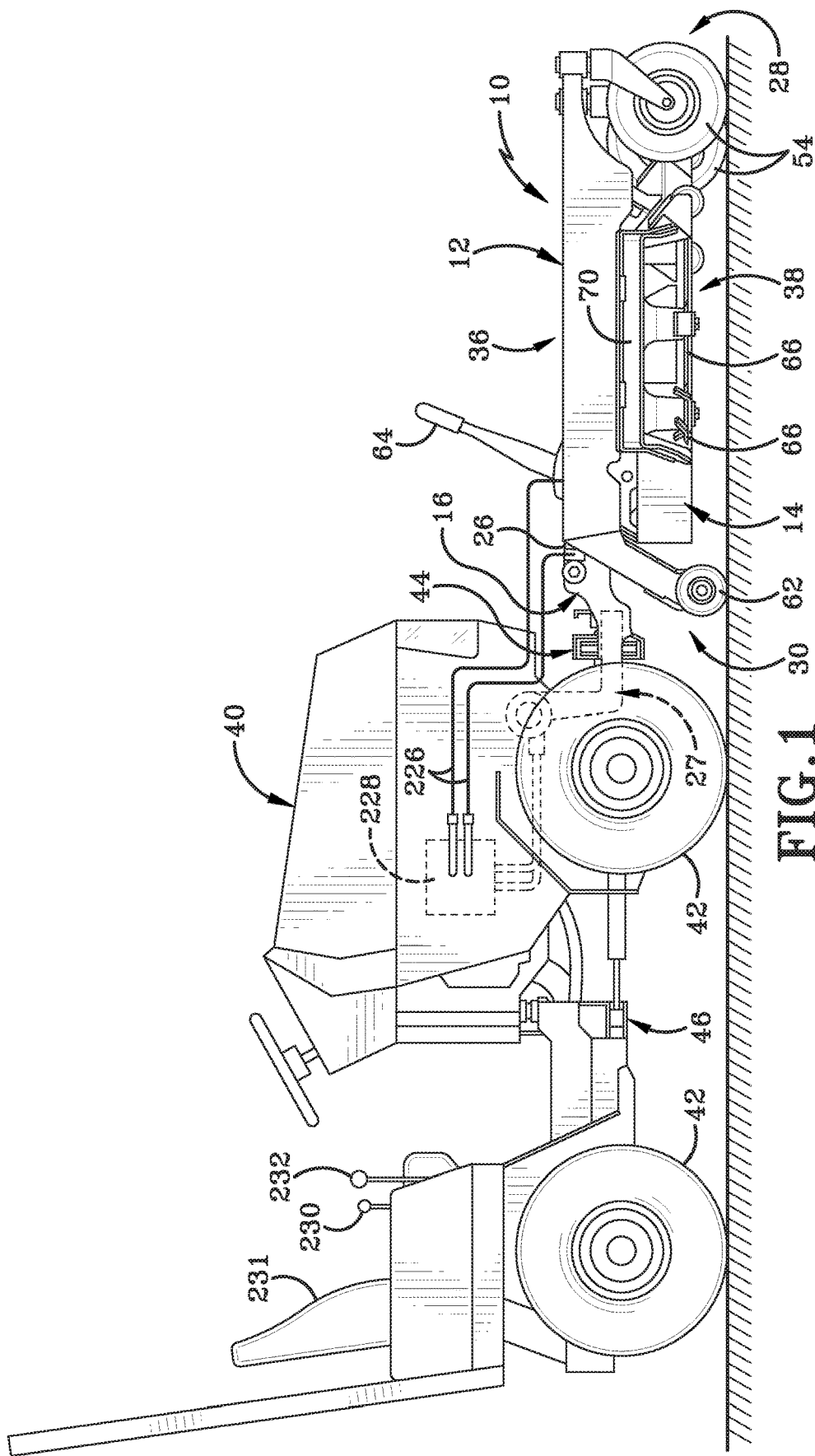
FIG. 1 is a side elevation view of a mower in accordance with the present disclosure attached to an outdoor power equipment or tractor device.

An outdoor power equipment device, which may also be referred to as a side discharge finish mower, is generally shown throughout the figures at 10. Mower 10 may include a carrier frame 12, a main frame 14, a first hitch arm 16, a second hitch arm 18, a drive belt assembly 20, a tensioner assembly 22, a lock assembly 24, and a hydraulic piston and cylinder assembly 26 for moving the mower 10 between a first position generally horizontal relative to the ground (FIG. 1) and an elevated position generally upright, vertical, or substantially perpendicular to the ground (FIG. 16) (note: the generally vertical position may be referred to as either the second position or the third position depending on how various movements and functions are being described). In one particular embodiment, it is advantageous for the mower 10 to be raised or flipped up to the generally vertical position (FIG. 16) so as to enable an operator to clean components of the mower 10 that would typically be covered in grass and other debris after the mower 10 was used.

Mower 10 includes a first or forward end 28 opposite a second end or trailing (or rear) end 30 defining a longitudinal direction therebetween. Mower 10 includes a first or left side 32 and an opposite second or right side 34 defining a transverse direction therebetween. Mower 10 further includes a top 36 opposite a bottom 38 defining a vertical direction therebetween.

Mower 10 is configured to attach with a drivable outdoor power equipment device shown generally at 40, which may also be referred to as tractor device 40, including at least one ground engaging wheel 42. The tractor device 40 includes a power takeoff (PTO) connector 44 that connects with the mower 10. In one particular embodiment, mower 10 is offset forwardly from a forward ground engaging wheel 42 on tractor device 40. One exemplary tractor device 40 for use with mower 10 is a Ventrac compact tractor commercially available for sale and known in the industry as a Ventrac 4500 tractor. The tractor device 40 may include an all-wheel drive system in addition to an articulating tractor frame 46. Tractor device 40 may further include a hydraulic assembly 27 configured to raise and tilt the mower intermediate the horizontal first position and the generally vertical position. In this instance, the tilted and raised position may be referred to as the second position and the generally vertical position may be referred to as the third position.

Figure 2:
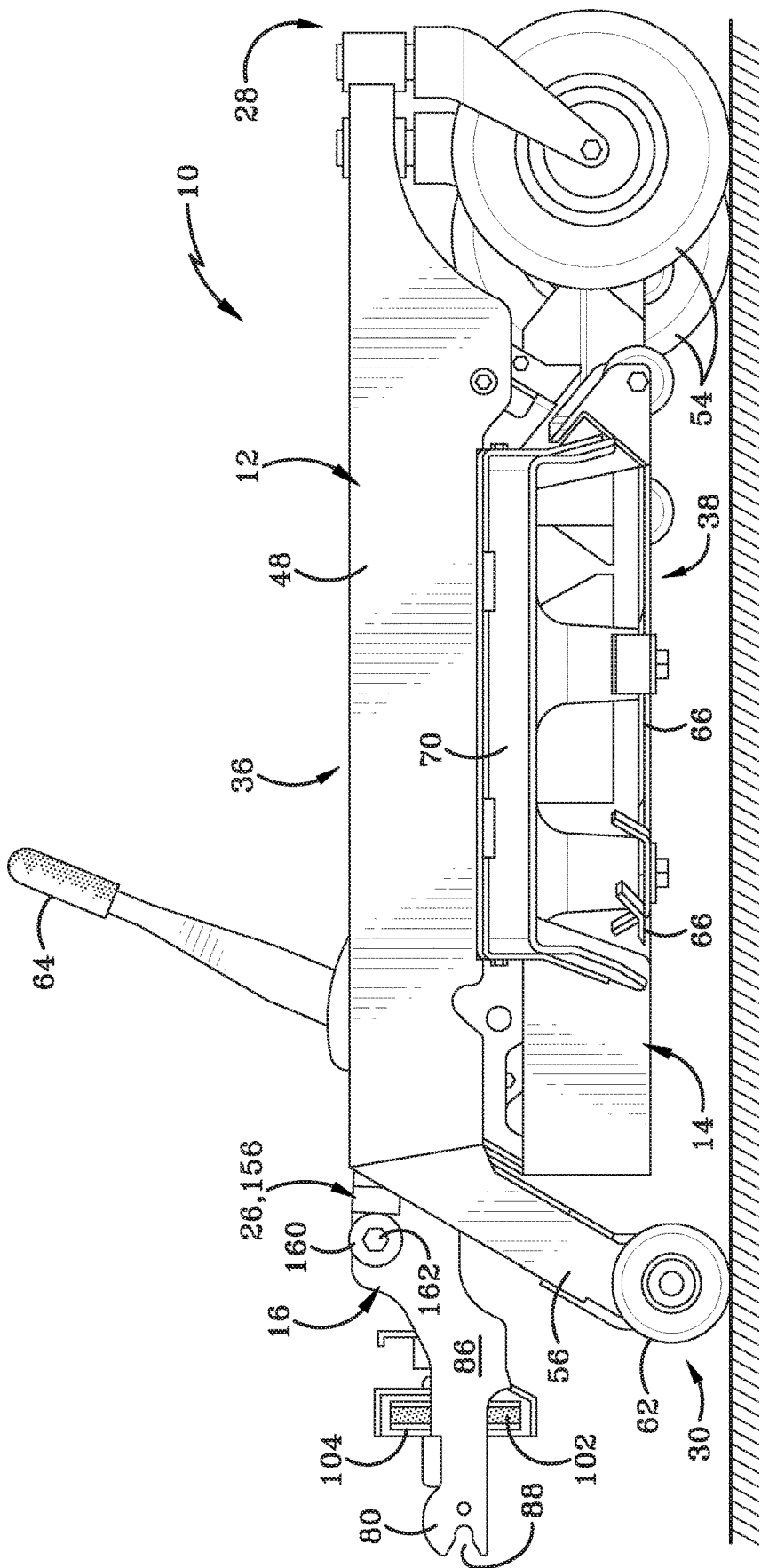
FIG. 2 is a side elevation view of the mower.
Figure 3:
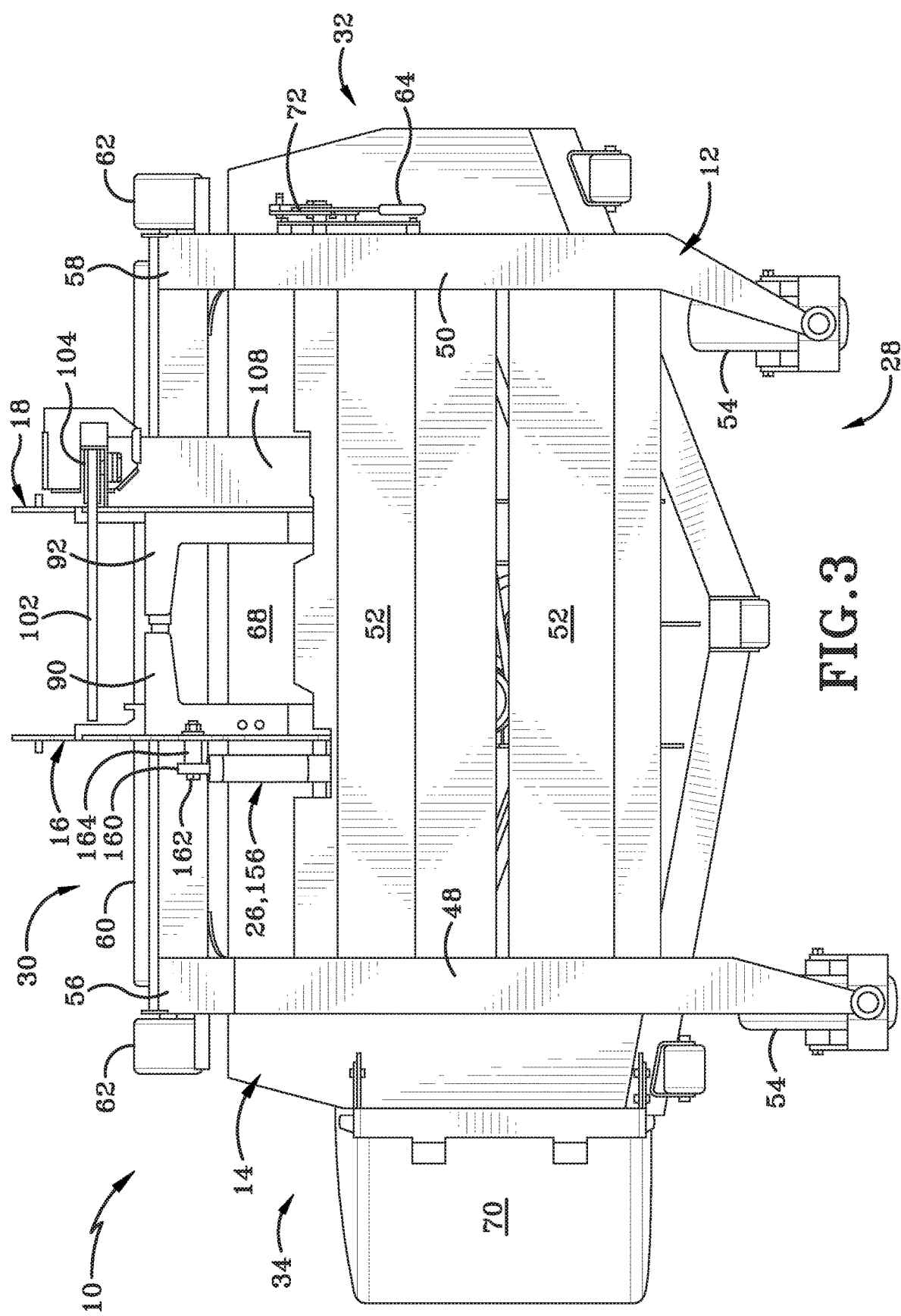
FIG. 3 is a top plan view of the mower.

As depicted in FIG. 2 and FIG. 3, carrier frame 12 includes a first longitudinally extending member 48, a second longitudinally extending member 50, and a transversely extending cover 52 positioned between the first and second members 48, 50. First and second members 48, 50 extend longitudinally from the second end 30 to the first end 28 of mower 10. A caster wheel 54 may be pivotably attached to a leading end of each member 48, 50. With respect to the second longitudinally extending member 50, the leading caster wheel 54 may be offset towards the second side 34. The offset of the caster wheel 54 on the second member 50 of carrier frame 12 assists the mower 10 when maneuvering around fence posts and other objects. In one particular embodiment, caster wheel 54 and its connection with second member 50 is offset on the order of about three inches to about nine inches from a majority of the longitudinally extending second member 50. Each member 48, 50 may have a respective downward extension 56, 58. A rear roller 60 is positioned generally between the downward extensions 56, 58. The rear roller 60 may be supported by an axle rotatably connected with the extensions 56, 58. An end roller 62 may be located exterior to each extension 56, 58 and be supported by the same axle as roller 60 located intermediate the downward extensions 56, 58. Roller 60 and end rollers 62 engage the ground when the mower 10 is in its operational position in order to mow and cut grass or the like. Accordingly, carrier frame 12 remains relatively stationary relative to ground.

Vertical adjustment lever 64 is operatively connected to the carrier frame 12 and the frame 14. The adjustment lever 64 is configured to vary the height of the frame 14 relative to the ground in order to vary the cutting height of mower blades 66 during the mowing operation of mower 10. Frame 14 varies its height in response to movement of the adjustment lever 64. Stated otherwise, frame 14 is operatively connected to carrier frame 12 such that adjustment of the lever 64 varies the position of the frame 14 relative to the carrier frame 12.

Figure 4:
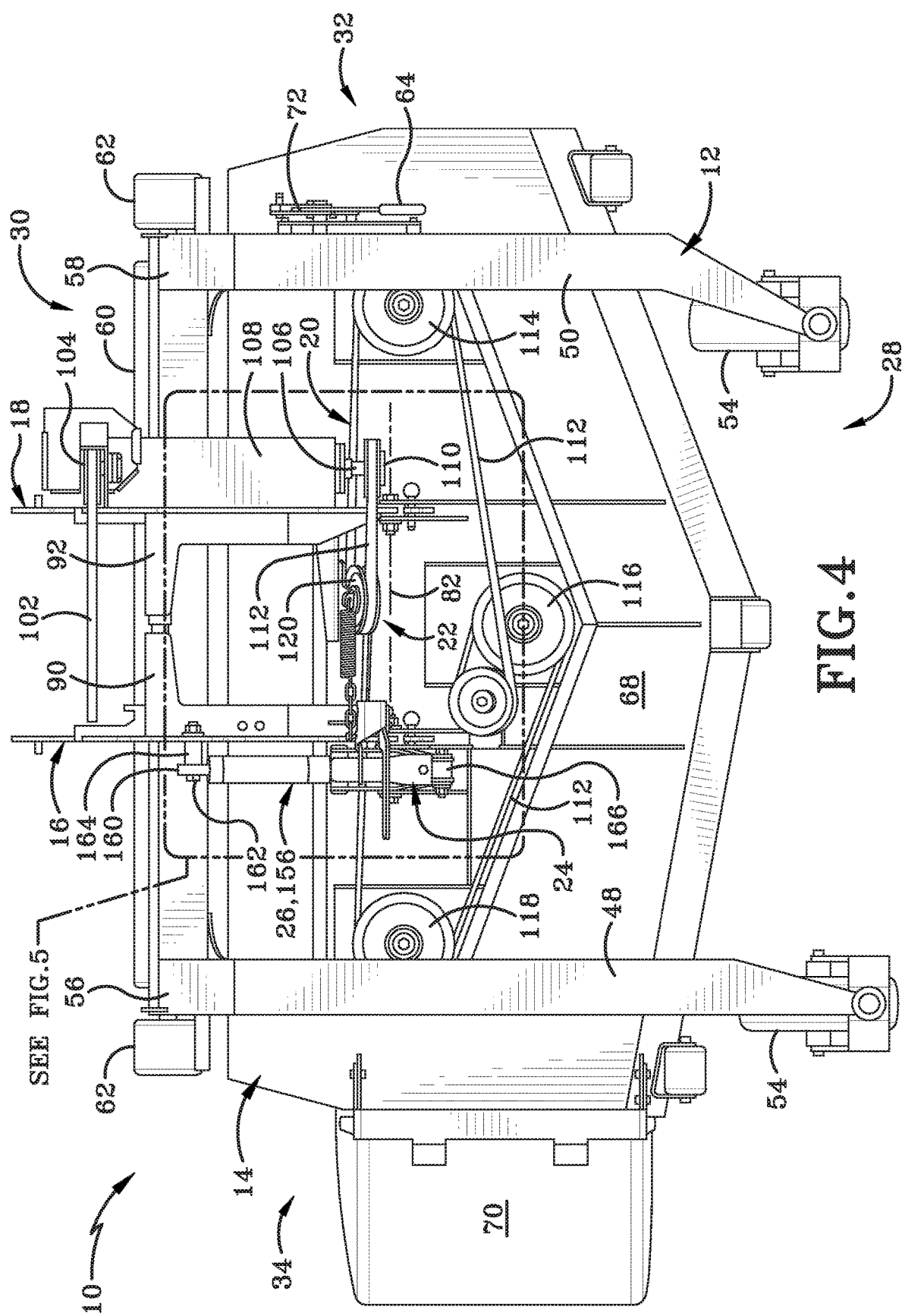
FIG. 4 is a top plan view of the mower with a cover on a carrier frame removed.
Figure 5:
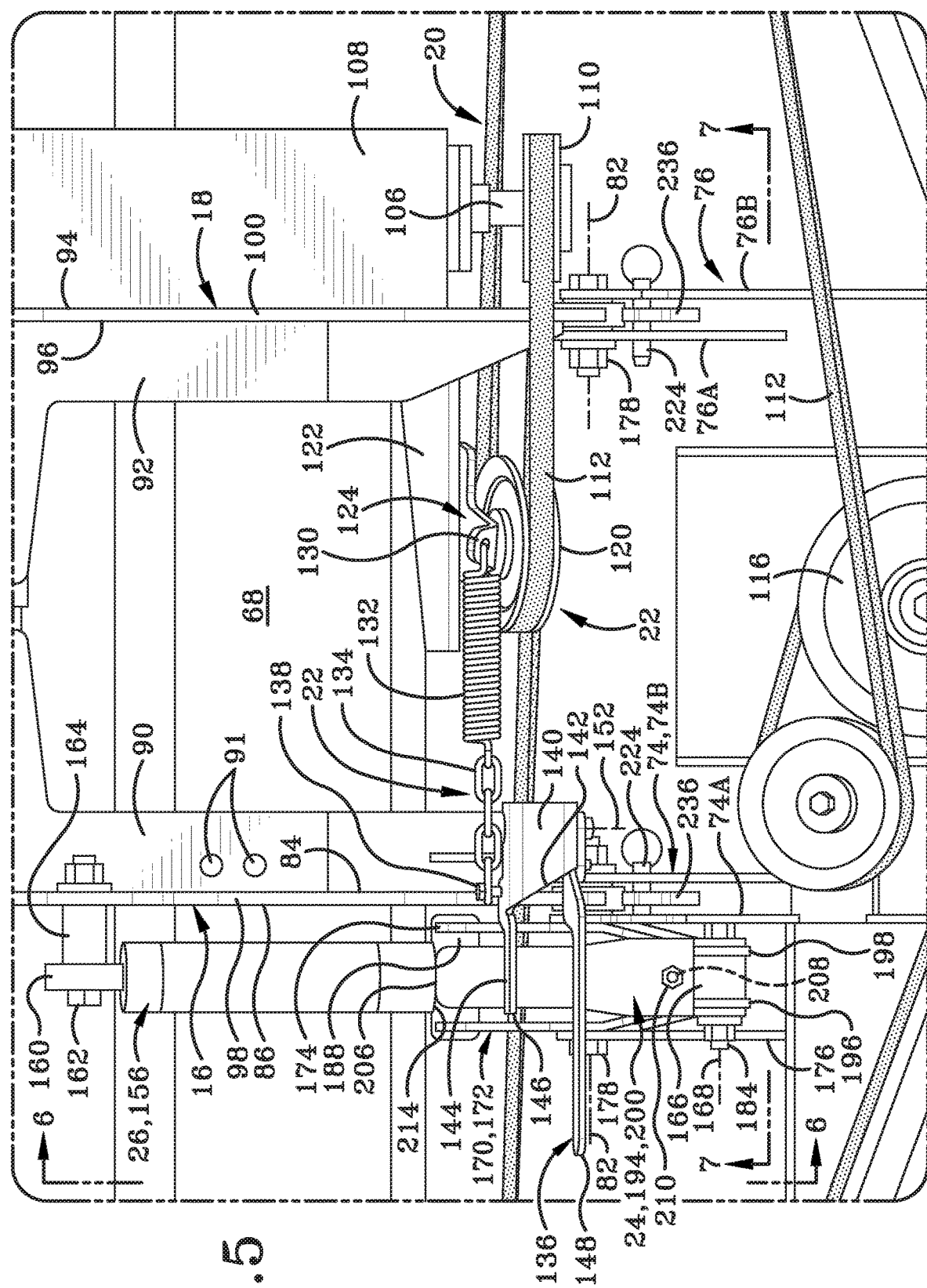
FIG. 5 is an enlarged top plan view of the region labeled "SEE FIG. 5" in FIG. 4.

As depicted in FIG. 4 a top view of the mower 10 is provided with the cover 52 of the carrier frame 12 being removed. As shown in the top view, the frame 14 includes an upwardly facing top major surface 68 that is sized sufficiently to carry the drive belt assembly 20 thereon. The frame 14 defines a discharge chute 70 along the second side 34 of mower 10. A height adjusting selector plate 72 extends upwardly from the top surface 68 of frame 14. The height adjusting selector plate 72 effectuates an adjustment linkage (i.e., linkage arm 216) that operatively connects the carrier frame 12 with the frame 14. More particularly, a bracket on the frame 14 couples with a bracket on carrier frame 12 with a lever and rod operatively connected therewith to adjust the height between the carrier 12 and the frame 14.

A first pair of flanges 74 extend upwardly from the top major surface 68 of frame 14. The pair of flanges 74 define a longitudinally extending gap therebetween. More particularly, a first flange 74A is substantially parallel to a second flange 74B. The first hitch arm 16 is configured to connect with the frame 14 by a portion of the first hitch arm 16 being positioned in the space defined between the first flange 74A and the second flange 74B. Similarly, a second pair of flanges 76 extend upwardly from the top surface 68 of frame 14. A third flange 76A and a fourth flange 76B define the second pair of flanges 76. More particularly, a slight longitudinal gap is defined between the parallel extending third flange 76A and fourth flange 76B. The forward end or leading end of the second hitch arm 18 is located in between the gap between third flange 76A and fourth flange 76B. Second hitch arm 18 operatively connects with the second pair of flanges 76 to operatively connect with frame 14.

Figure 6:
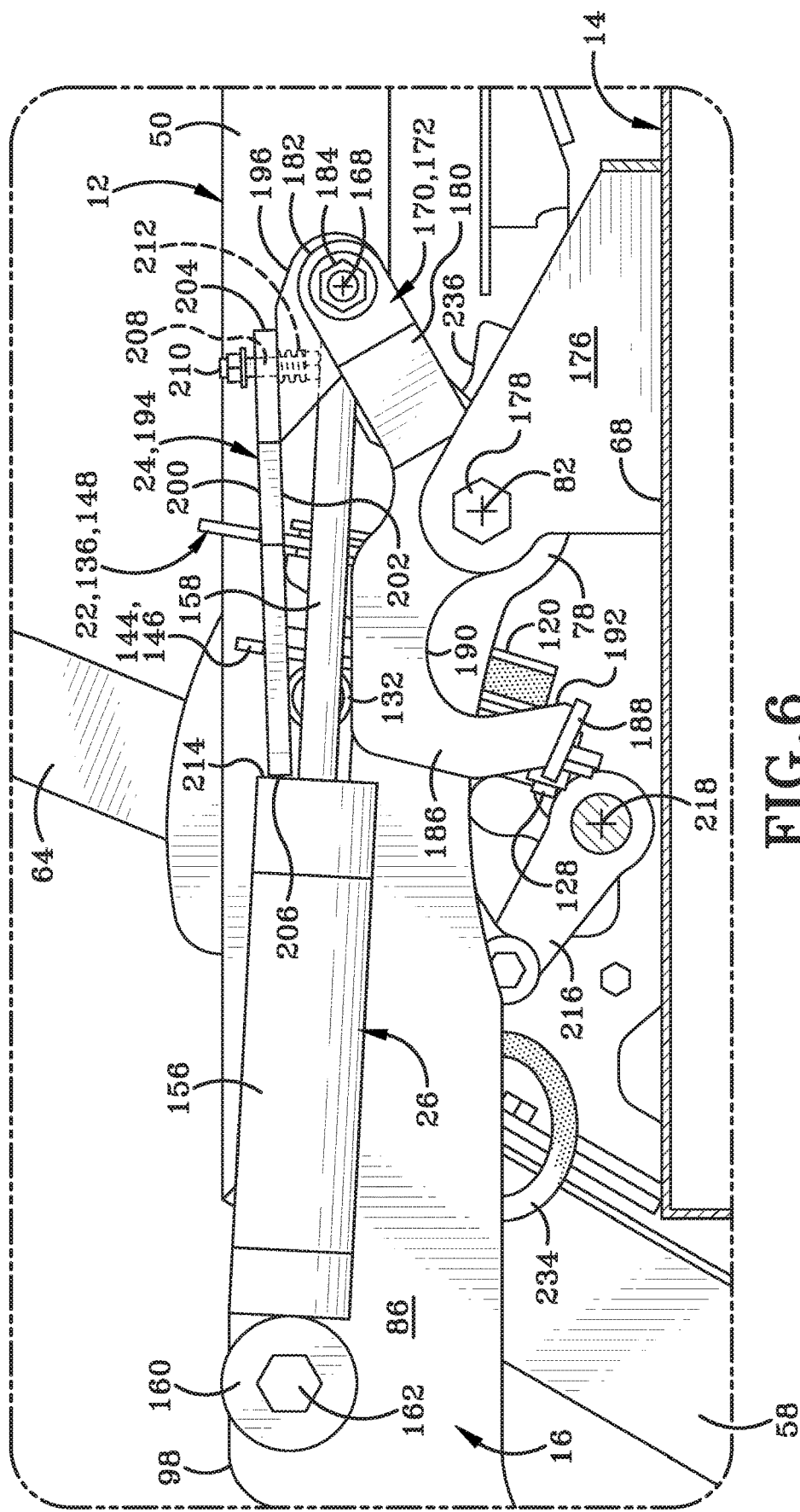
FIG. 6 is a longitudinal cross section taken along line 6-6 in FIG. 5.
Figure 7:
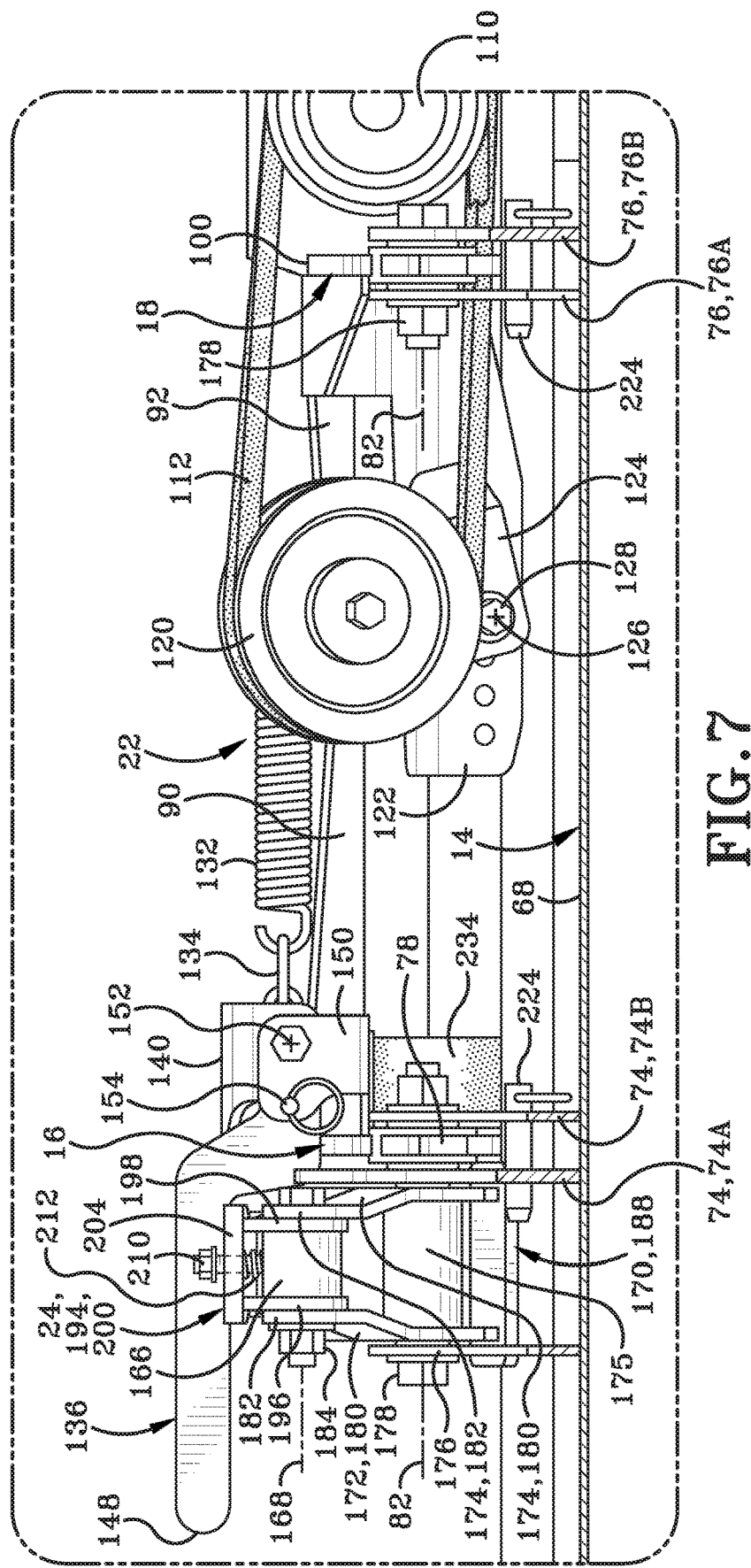
FIG. 7 is a transverse cross section taken along line 7-7 in FIG. 5.

As depicted in FIG. 2 and FIG. 6, first hitch arm 16 includes a forward end 78 and a rear end 80. First hitch arm 16 is a substantially rigid member longitudinally extended between forward first end 78 and rear end 80. Forward first end 78 is connected with the pair of flanges 74 via a rod establishing a pivot axis 82. Pivot axis 82 extends transversely above main frame 14. Particularly, pivot axis 82 is perpendicular to the longitudinal alignment of the first pair of flanges 74 and the second pair of flanges 76. Additionally, the pivot axis 82 is substantially perpendicular to the longitudinal length of first hitch arm 16 and perpendicular to the longitudinal length of second hitch arm 18. First arm 16 includes the vertically aligned and transversely facing first major surface 84 opposite a vertically aligned and transversely facing second major surface 86. First and second surfaces 84, 86 of first arm 16 are positioned entirely between first flange 74A and second flange 74B. A connection cutout 88 is defined near the second end 80 of first arm 16. Connection cutout 88 is configured to attach with the tractor device 40 to effectuate the connection between the mower 10 and a portion of the tractor device 40. In one particular embodiment, when the mower 10 is connected to the tractor device 40, the connection cutout 88 is positioned rearwardly from the power takeoff connector 44. First hitch arm 16 further includes a transverse extension 90 extending towards the first side 32. Transverse extension 90 is connected with an opposingly extending transverse extension 92 on second hitch arm 18. The transverse extension 90 is connected with an opposingly extended transverse extension 92 on second hitch arm 18. The first hitch arm 16 can define one or more vertically aligned through holes 91 which are designed to retain or receive a hydraulic line from tractor device 40 when the hydraulic lines are disconnected from hydraulic piston and cylinder assembly 26.

Second hitch arm 18 includes a first major surface 94 facing the first side 32 and a second major surface 96 facing the second side 34. The trailing end of second hitch arm 18 is shaped with a connection cutout 88. Additionally, the leading end of the second hitch arm 18 is connected with a second pair of flanges 76 such that the first and second major surface 94, 96 of second hitch arm 18 are positioned between the third flange 76A and the fourth flange 76B. The second hitch arm 18 is connected with the second pair of flanges 76 via a pivot connection (i.e., a bolt or rod) along axis 82. Inasmuch as the first and second hitch arms 16, 18 are substantially rigid and planar elongated members, each hitch arm includes an upwardly facing minor surface established by the transversely aligned thickness of each hitch arm. More particularly, a top minor surface 98 is established by the transverse width of the first hitch arm 16 between the first major surface 84 and the second major surface 86. Similarly, an upwardly facing top minor surface of the second hitch arm 18 is established by the transverse width and thickness of the second hitch arm 18 between first surface 94 and second surface 96. In one embodiment, a top minor surface 98 is positioned vertically above the first pair of flanges 74 and the top minor surface 100 on second hitch arm 18 is positioned vertically above the second pair of flanges 76. Pivot axis 82 is positioned rearwardly from an imaginary and transversely extending center line located halfway between the forward end 28 and the rear end 30 on mower 10.

Drive belt assembly 22 includes a belt 102 connected with PTO connector 44 on tractor device 40. Belt 102 connects with a sheave or wheel 104 attached to a driveshaft 106 housed within a driveshaft housing 108. Housing 108 is offset to the first side 32 from the first surface 94 of second hitch arm 18. In one particular embodiment, driveshaft 106 extends parallel to the first and second hitch arms 16, 18 and is also parallel to the first pair of flanges 74 and the second pair off flanges 76. A leading drive sheave or wheel 110 is rigidly connected with driveshaft 106 positioned forwardly from housing 108. Drive wheel 110 receives a second belt 112 therearound. Belt 112 wraps around a first wheel 114, a second wheel 116, and a third wheel 118. The first, second, and third wheels 114, 116, 118 are operatively connected to respective mower blades 66 located beneath the main frame 14. The operative connection of wheels 114, 116, 118 to mower blades 66 effectuate the mower 10 to cut grass or other material beneath the mower 10 when the belt 112 causes the wheels 114, 116, 118 to rotate as driven by the tractor device 40, causing the driveshaft 106 to rotate about its longitudinally axis. In one embodiment, the first wheel 114 is associated with the first side 32 of mower 10 and the third wheel 118 is associated with the second side 34 of mower 10. Additionally, second wheel 116 may be positioned intermediate the first wheel 114 and the third wheel 118 in an offset position forwardly towards the forward end 28 of mower 10. In one instance, second wheel 116 is positioned intermediate the first pair of flanges 74 and the second pair of flanges 76. Stated otherwise, second wheel 116 is located transversely between the first hitch arm 16 and the second hitch arm 18. First wheel 114 is offset towards the first side relative to second hitch arm 18 and the third wheel 118 is offset towards the second side relative to first hitch arm 16.

The tensioner assembly 22 includes a tension sheave, also referred to as tension wheel 120, positioned intermediate the first pair of flanges 74 and the second pair of flanges 76. Tension wheel 120 receives the belt 112 therearound. Tension wheel 120 is supported by a flange 122 extending upwardly from surface 68 on main frame 14. Flange 122 is connected with a bracket 124 via a pivotable arrangement such that wheel 120 may rotate about a pivot axis 126 established by bolt 128 effectuating the connection between bracket 124 and flange 122. An upper portion of bracket 124 includes an extended portion 130 defining an aperture therethrough configured to receive an extension coil spring 132. The extension coil spring includes a first end connected with extension 130 on bracket 124 and a second end connected with a chain 134. The connection of chain 134 with extension coil spring 132 creates a transversely aligned linkage between wheel 120 and a handle 136. More particularly, one end of chain 134 is connected with a bolt or pin 138, which is rigidly connected with a flange or plate 140. Bolt 130 extends longitudinally in a cantilevered manner from plate 140. Plate 140 includes an angled edge 142 that crosses over the minor top surface 98 of first hitch arm 16 at an angle and a range from about 30 degrees to about 60 degrees. The angled edge 142 connects with a secondary extension 144 which extends transversely towards the second side 34 in a cantilevered manner from a rigid connection with plate 140. The terminal end 146 of extension 144 does not extend as far out towards the second side as the terminal end 146 of handle 136. Transversely extending secondary extension 144 is substantially parallel to handle 136. In one particular embodiment, the terminal end 148 on handle 136 extends beyond lock assembly 24 and the terminal end 146 of extension 144 does not fully extend beyond the lock assembly 24. A portion of the handle 136 and the extension 144 are positioned above the lock assembly when the tensioner assembly is in a closed first position under tension. As will be described in greater detail below, the tension assembly 22 may be moved from the closed first position in tension to an open second position to effectuate a relaxed state. Inasmuch as the handle 136 is rigidly connected with plate 140, and the extension 144 is rigidly connected with plate 140, when the handle 136 is moved from the closed first position to the open second position, the extension member 144 moves in unison with the handle 136. Plate 140 is connected with first hitch arm 16 via a flange 150 which extends upwardly from first hitch arm 16. A bolt establishes a longitudinally-extending pivot axis 152 about which the handle 136 and the secondary extension 144 may rotate when a pin 154 is removed. Locked pin 154 extends through plate 150 and connects with handle 136 adjacent its rigid connection with plate 140 so as to prevent handle 136 from rotating about axis 152 when the pint 154 is inserted longitudinally through the plate 150 and the handle 136. Axis 152 is longitudinally aligned and orthogonal to transverse axis 82 about which the frame pivots relative to the hitch arms 16, 18. In one particular embodiment, axis 152 is offset towards the first side 32 of first surface 84 of first hitch arm 16.

Hydraulic piston and cylinder assembly 26 includes a cylinder 156 and a piston 158. Cylinder 156 includes a trailing end 160 rigidly connected with the first arm 16 via a transversely-extending bolt 162 and a spacer 164 so as to offset the cylinder 156 a slight distance from second surface 86 of first hitch arm 16. Piston 158 includes a leading end 166 that is freely connected at a pivot axis 168 with a pair of rocker arms on a rocker arm assembly 170.

Rocker arm assembly 170 is positioned towards the second side 34 from the first pair of flanges 74 and includes a first rocker arm 172 and a second rocker arm 174. The first and second rocker arms 172, 174 are positioned offset towards the second side 34 from the first hitch arm 16. A rocker arm support flange 176 is rigidly connected with main frame 14 longitudinally aligned generally parallel to the first pair of flanges 74. A rocker arm support flange 176 extends upwardly from the rigid connection with frame 42 to define an aperture coaxial along axis 82. A transversely-aligned connection bolt or rod 178 connects the rocker arm assembly 170 with the first flange 74A. Each rocker arm is spaced apart along axis 82 via a spacer bushing 175 concentric with axis 82. Each rocker arm of the rocker arm assembly includes a leading portion 180 that extends forwardly from the pivotable connection around axis 82, terminating at a forwardmost end 182. The forward portion 180 angles and tapers inwardly towards the opposing rocker arm which is part of the rocker arm assembly 170. Stated otherwise, the forward portion 180 on the first rocker arm 172 tapers inwardly towards the second rocker arm 174. Additionally, the forward portion 180 on the second rocker arm 174 tapers inwardly towards the first rocker arm 172. The terminal end 182 of each rocker arm 172, 174 is spaced apart so as to receiving leading end 166 of piston 158 therebetween. A bolt 184 defines a transverse axis 186. Bolt 184 freely connects the terminal ends of the first and second rocker arms 172, 174 with the leading end 166 of the piston 158. The free connection of the piston end 166 with the bolt 184 establishes and enables the piston 158 to pivot about axis 186. The transverse axis 168 is offset parallel to transverse axis 82. Additionally, transverse axis 168 is orthogonal to longitudinal axis 152.

Each rocker arm 172, 174 includes a rear second portion 186. The rear second portion 186 of each rocker arm 172, 174 is arcuately curved from the pivot connection about axis 82 to a lower end connected with a transversely extending foot 188 rigidly connected with both rear portions 186 of each respective rocker arm 172, 174. Foot 188 is adapted to make contact with frame 14 as the mower 10 is transitioning from the first position to the second position. More particularly, rear extension 186 includes a convexly-curved edge 190 which extends from the forward end substantially co-linear with a portion of flange 176 in a concave arcuate manner to a linear portion 192 which extends a short distance in a straight line towards a connection with the foot 188.

The lock assembly 24 includes a top lock plate 194 and a first downwardly extending leg 196 and a second downwardly extending leg 198. Top lock plate 194 includes an upwardly facing top surface 200 and a downwardly facing bottom surface 202. Top lock plate 194 further comprises a leading end 204 opposite a trailing end 206. The upwardly facing top surface 200 defines a major surface area of the top plate 194. Stated otherwise, the transverse width measured between side edges and the longitudinal length measured between the forward end 204 and rear end 206 of plate 194 define an upwardly facing top surface area that is significantly greater than the thickness of the plate. Stated otherwise, plate 194 is a substantially planar member that is oriented longitudinally having a length that is its greatest dimension. In one particular embodiment, the leading end 204 of plate 194 has a transverse width that is greater than the trailing end 206 of the plate. Accordingly, side edges of the plate 194 taper inwardly towards each other from the forward end 204 towards the rear end 206. The first and second legs 196, 198 extend downwardly from a rigid connection with the bottom surface 202 in a spaced apart manner. More particularly, first leg 196 and second leg 198 extend forwardly and downwardly from forward end 204. The first and second legs 196, 198 define a transverse gap therebetween and include transversely-aligned apertures configured to receive the bolt 184 therethrough such that the transversely-aligned apertures in plates 196, 198 are coaxial along transverse axis 168. Plate 194 further defines a vertically-aligned aperture 208 receiving a bolt 210 therethrough. A compression coil spring 212 is in operative communication with the bolt 210 and contacts the bottom surface 202 of plate 194. The coil spring 212 biases the plate upward when the lock assembly 24 is unlocked. As will be described in greater detail below, the lock assembly 24 is moved from a locked position to an unlocked position in response to movement of tensioner assembly 22 from the closed first position in tension to the open second position in a relaxed state. When the lock assembly 24 is in the locked position (as best seen in FIG. 6), the trailing end 206 of the lock plate 194 contacts directly and abuts an annular end wall 214 on the cylinder 156 of the hydraulic piston and cylinder assembly 26. When the lock plate 194 contacts the annular end wall 214, plate 194 and its rigid construction prevents the piston 158 from retracting inside the cylinder 156. The annular end wall 214 has a vertically-aligned height that is greater than the thickness of the plate 194 such that a substantial portion of the rear end 206 of plate 194 contacts the annular end wall 214 when the handle 136 extends over the upwardly facing top surface 200 of plate 194.

As described in greater detail below, and in accordance with one aspect of the present disclosure, the tensioner assembly 22 has at least two functions. The first function of the tensioner assembly 22 is to maintain tension on belt 112. Additionally, the tensioner assembly 22 assists to lock the locking device 24 in its locked position when the tensioner assembly 22 is in the closed first position. More particularly, and as will be described in greater detail below, the handle 136 and the second extension 144 on the tensioner assembly 22 are in direct contact with the upwardly-facing top surface 200 and plate 194 in order to maintain a direct abutment of end 206 with annular end wall 214.

Figure 8:
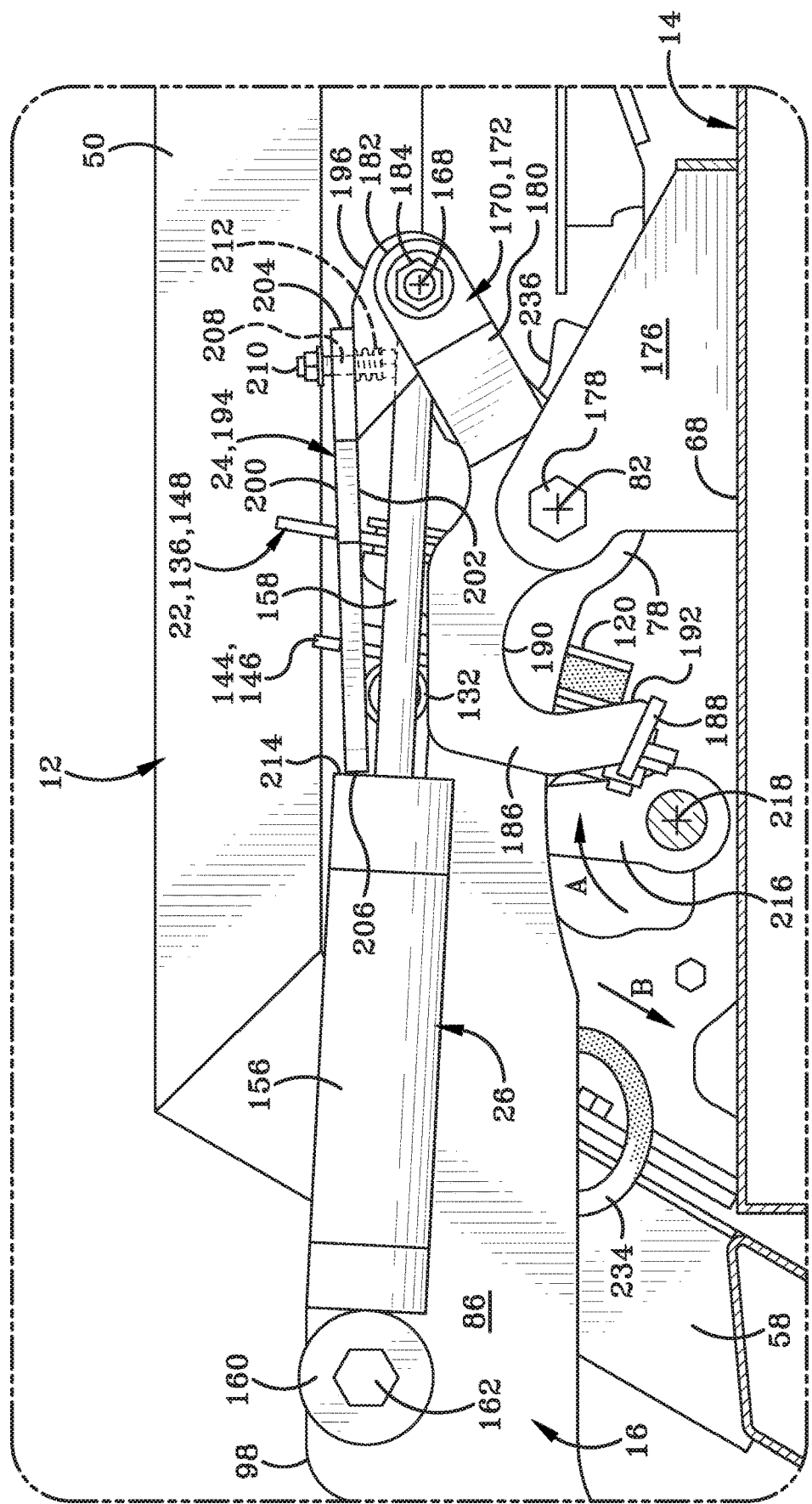
FIG. 8 is an operational longitudinal cross section of the mower.

FIG. 8 depicts the initial procedures and operations for transitioning the mower 10 between the operational first position and the generally vertical second position (which may also be referred to as a third position when there is an intermediate tilted and raised second position). A user rotates the lever 64 relative to plate 72. Lever 64 is connected with a linkage arm 216 to rotate about a transverse axis 218. The rotation of linkage arm 216 about axis 218 is indicated by arrow A. In response to the linkage arm 216 rotating about transverse axis 218, the main frame 14 is lowered downwardly and rearwardly in the direction of arrow B.

Prior to further additional movement of the mower 10, lock pins 224 may be removed in a transverse direction by pulling them forwardly from their connection with the first pair of flanges 74 and the second pair of flanges 76, respectively. If the pins 224 are removed from their releasable connections with the first pair of flanges 74 and the second pair of flanges 76, the frame 14 and the carrier frame 12 are able to be rotated about axis 82.

Figure 9:
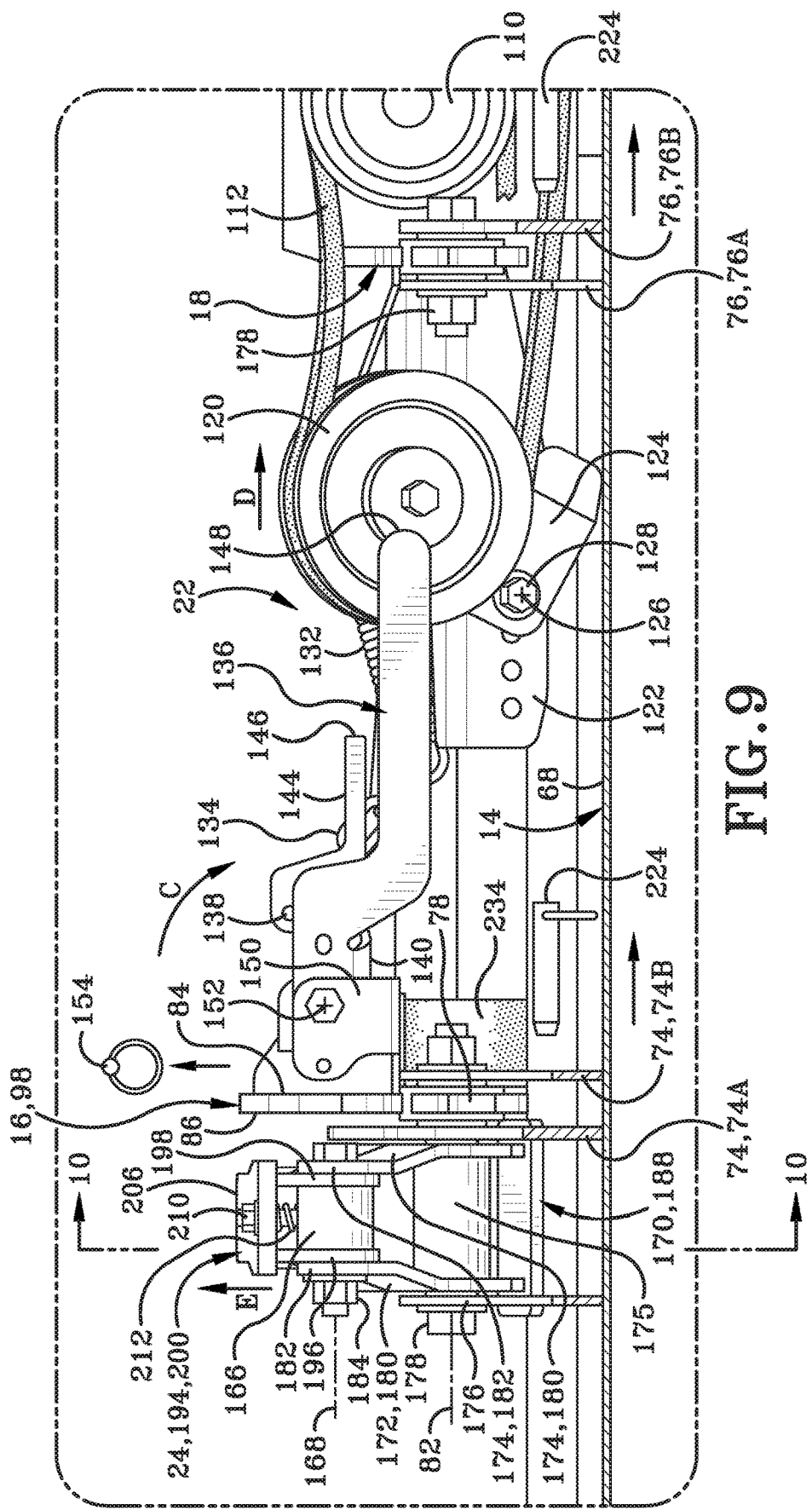
FIG. 9 is an operational transverse cross section of the mower depicting a portion of a tensioner assembly moving to an open position.

FIG. 9 depicts the operation of moving the tensioner assembly 22 from the closed first position to the open second position. The pin 154 is removed from its connection with plate 150. The handle 136 is rotated in a clockwise manner about axis 152 as indicated by arrow C. The handle 136 is rotated approximately 180 degrees such that it is aligned substantially parallel to the upwardly facing top surface 68 on frame 14. As the handle 136 is rotated, it releases its contact with the upwardly facing top surface 200 of plate 194 on the lock assembly. Rotation of handle 144 about axis 152 in the direction of arrow C also causes second extension 144 and plate 140 to similarly rotate about axis 152 in the direction of arrow C. Inasmuch as the bolt 138 is rigidly fixed to plate 140, the bolt 138 also rotates about axis 152. The chain 134 is connected with bolt 138. Accordingly, as bolt 138 moves about axis 152 in the direction of arrow C, the chain 134 is released from a tensed state to a relaxed or slacked state. Slack in the chain 134 causes the spring 132 to sag and release its tension on the wheel 120 via its connection with the tab extension 130 on bracket 124. Slack in chain 134 and spring 132 cause the wheel 124 to translate and rotate towards the first side 32 in the direction indicated by arrow D. The transverse translation and rotation of wheel 120 causes slack in the belt 112 as the wheel 120 pivots about longitudinal axis 126 established by bolt 128 extending through bracket 124 and flange 122. When the belt 112 is in a slacked or relaxed state, the amount of tension in the tensioner assembly 22 is less than that of the tension when the tensioner assembly 22 is in its tensed state. After the handle 136 on the tensioner assembly 22 has been moved from its closed first position to its open second position (FIG. 9), the spring 212 beneath the plate 194 urges the plate upwardly in the direction of arrow E. Urging of plate 194 upwardly moves the lock assembly from its locked first position to an unlocked second position. When the plate 194 is in the unlocked second position, the end 206 of plate 194 is out of contact or disconnected from the annular end wall 214 on cylinder 156.

Figure 10:
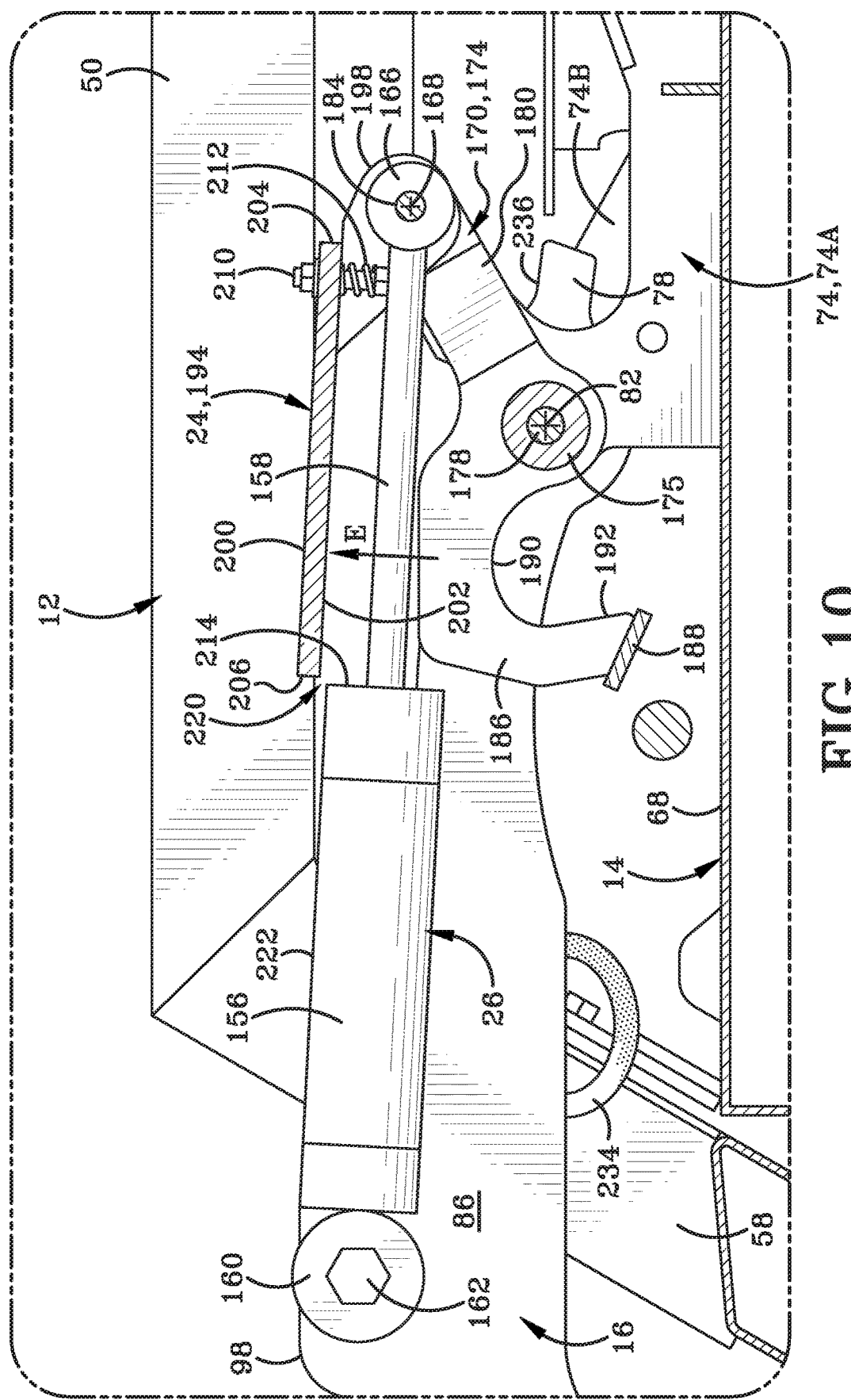
FIG. 10 is an operational longitudinal cross section of the mower depicting a portion of a lock assembly in an unlocked position.

FIG. 10 depicts that the plate 194 on the lock assembly 24 has been urged upwardly in the direction of arrow E via spring 212 after the handle 136 has been rotated in the direction of arrow C. When the lock plate 194 is in its unlocked position (FIG. 10), the end 206 of lock plate 194 is positioned vertically above the annular end wall 214 of cylinder 156. A slight gap 220 is established between the end wall 206 and the annular wall 214 on cylinder 156. Additionally, the gap 220 is offset and slightly above a top surface 222 of the cylinder 156. As will be described in greater detail below, when the piston and cylinder 26 begins to draw the piston 58 into the cylinder 156, the lock plate 194 passes above the top surface 222 of cylinder 156. More particularly, the bottom surface 202 of plate 194 passes over the annular end wall 214 and is positioned above the top surface 222 of cylinder 156.

Figure 11:
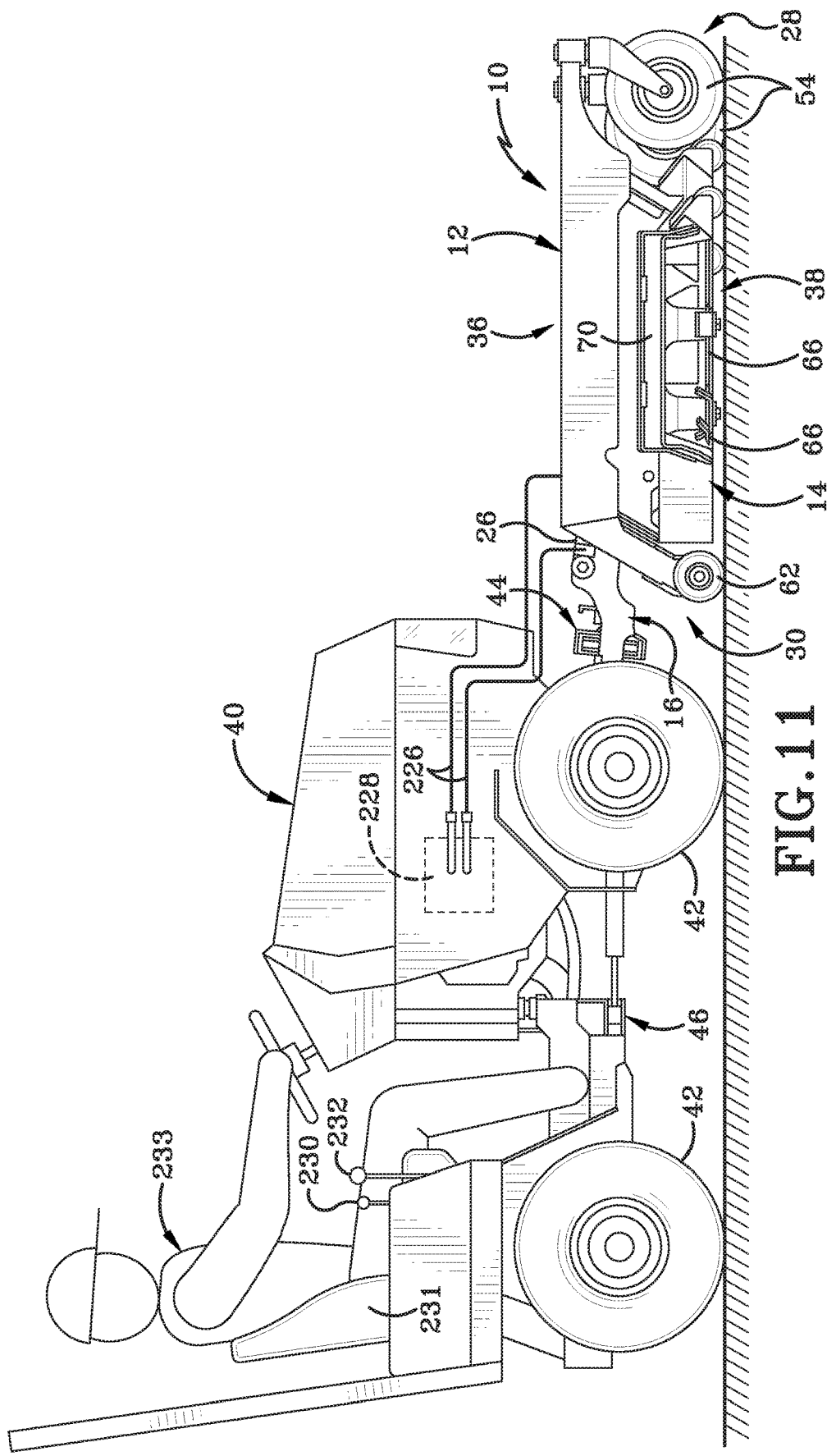
FIG. 11 is an operational side elevation view of the mower in a lowered position.

FIG. 11 depicts the raising of the mower 10 from the lowered first position to the vertical position occurs in a hands-free manner. Note, the generally vertical position may also be referred to as a "third position" herein and in the appended claims. The third position is the final vertical position when there is an intervening second position as detailed below.

Figure 16:
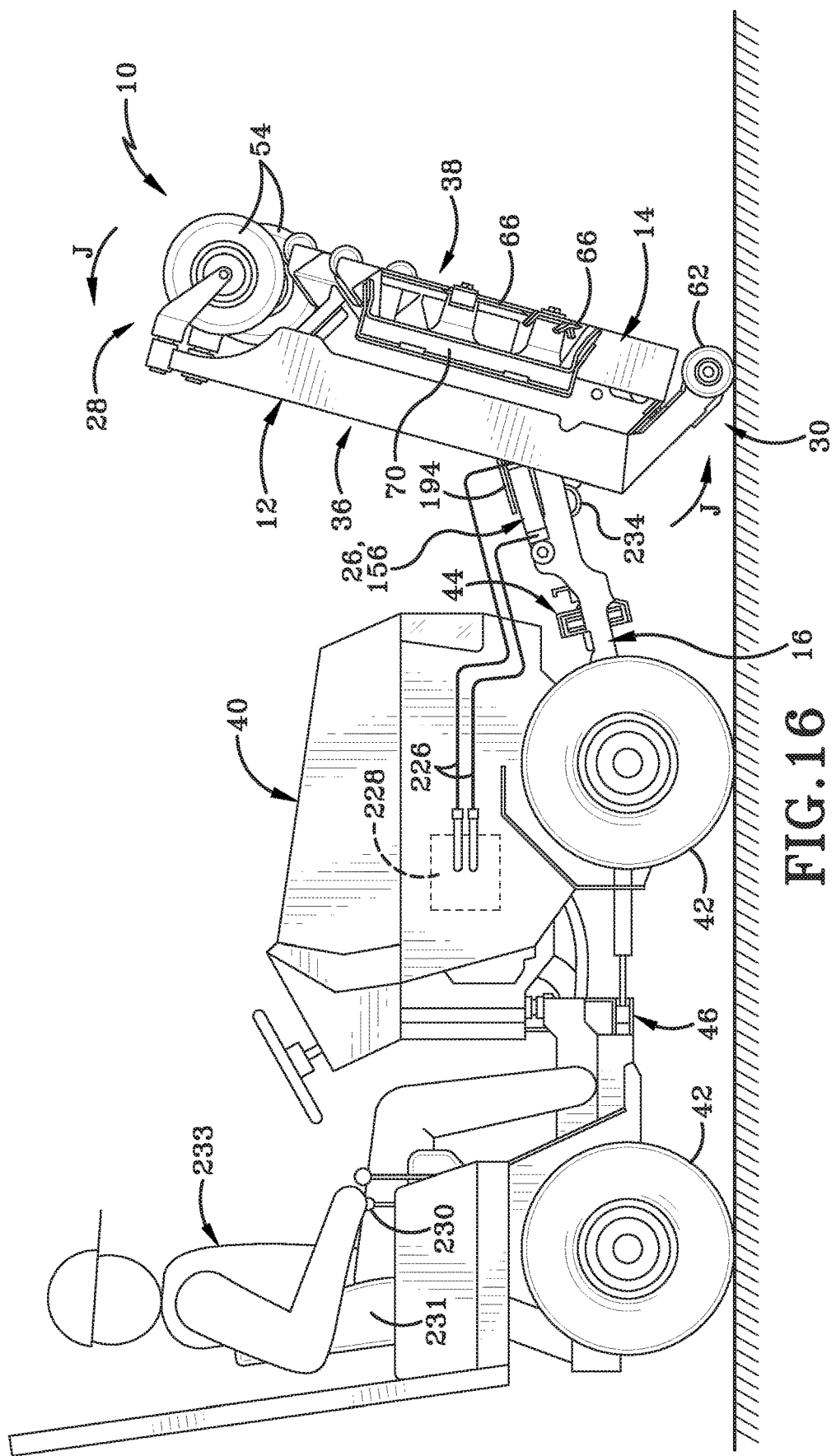
FIG. 16 is an operational side elevation view of the mower in the generally vertical second position.

In one particular embodiment, the hydraulics (i.e., hydraulic assembly 27) of the tractor device 40 are utilized to effectuate the lifting of the mower 10 from the lowered first position to the tilted and raised second position at an angle in a range from about 5° to about 25° relative to horizontal. Then, the hydraulics (i.e., hydraulic assembly 26) on mower 10 are used to raise the mower 10 from the second position to the generally vertical third position (FIG. 16). Hydraulic lines 226 are connected with the hydraulic piston and cylinder assembly 26 carried by mower 10 (and additionally with hydraulic assembly 27 carried by tractor device 40). As one having ordinary skill in the art would understand, tractor device 40 includes a hydraulic pump 228 that pumps hydraulic fluid through lines 226 to effectuate the movement of piston 158 relative to cylinder 156. A first hydraulic lever 230 and a second hydraulic lever 232 on tractor device 240 are in operative communication with the hydraulic pump 228. In one particular embodiment, levers 230, 232 are positioned near the operator's seat 231 such that the operator 233 is able to control the hydraulic fluid to effectuate movement in a secondary device or attachment, such as mower 10, from the seated position while driving tractor device 40. Additionally, movement of the attachment or mower 10 occurring forwardly from the tractor device 40 occurs while the operator 233 is in a safe location rearward from the forward ground engaging wheel on tractor device 40, preferably while seated on seat 231.

Figure 12:
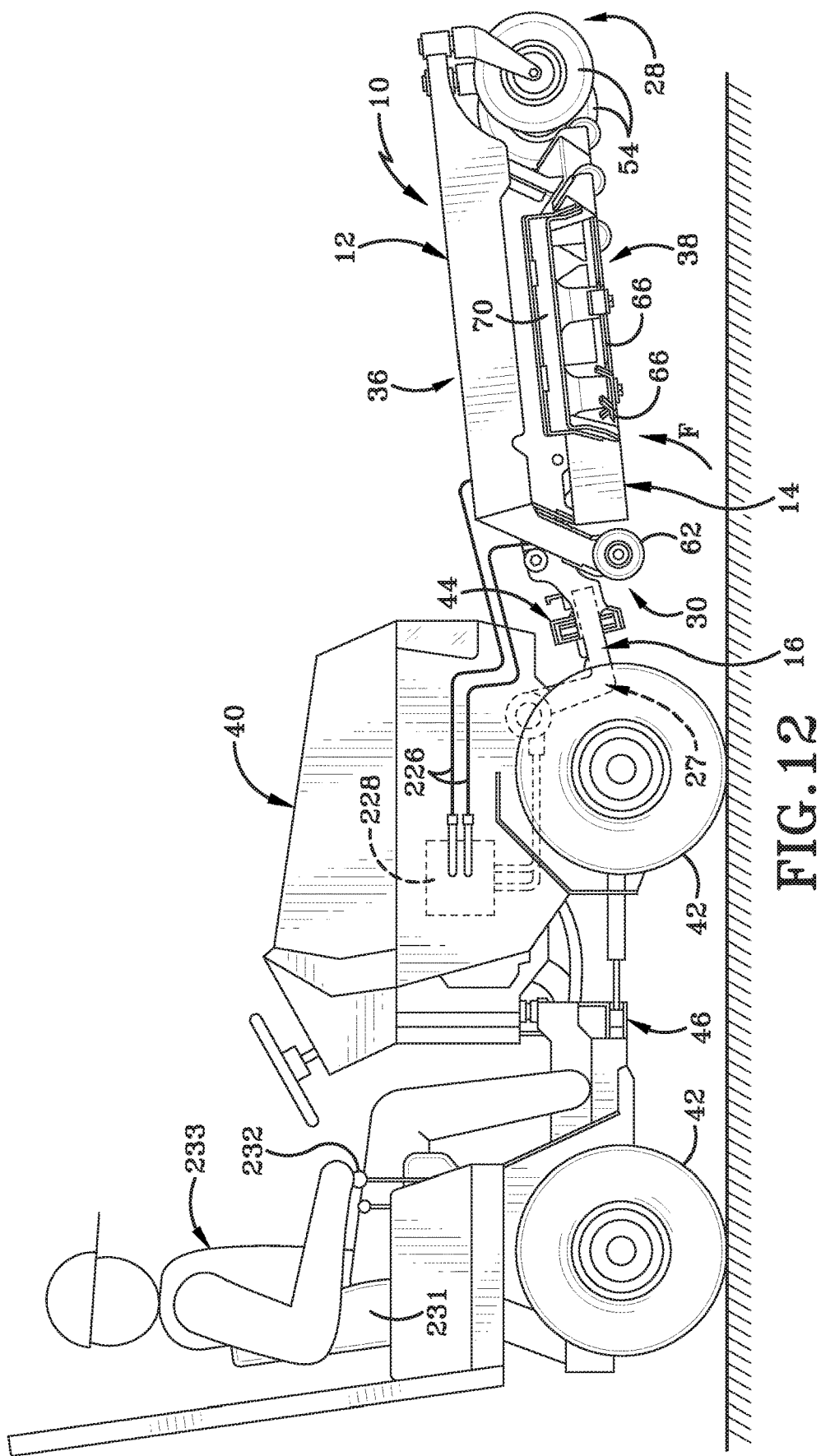
FIG. 12 is an operational side elevation view of the mower in a raised and tilted position.

FIG. 12 depicts the operator manipulates one of the two handles, such as second lever 232 to raise the entire mower assembly in the direction of arrow F via hydraulic assembly 27 carried by tractor device 40. Lever 232 raises the first and second hitch arms 16, 18 via movement of hydraulic pistons and cylinders carried by tractor device 40 (i.e., hydraulic assembly 27). State otherwise, the hydraulic assembly 27 lifts the attachment (i.e., mower 10) from a generally horizontal first position to a raised and tilted second position (FIG. 12), wherein the attachment in the second position is about the ground at an angle in a range from about 5° to about 30° relative to horizontal. The purpose of raising mower 10 with the hydraulic arms on tractor device 40 is configured to provide enough clearance for mower 10 as mower 10 is moved from the horizontal position to the generally vertical position as is accomplished by the hydraulic piston cylinder assembly 26 (i.e., in this instance the vertical position is referred to as a third position). When the tractor device 40 utilizes its hydraulic assembly 27 to raise the mower 10 to the tilted second position, the entire mower unit is raised off the ground such that no portion touches the ground and is freely suspended in the air.

Figure 13:
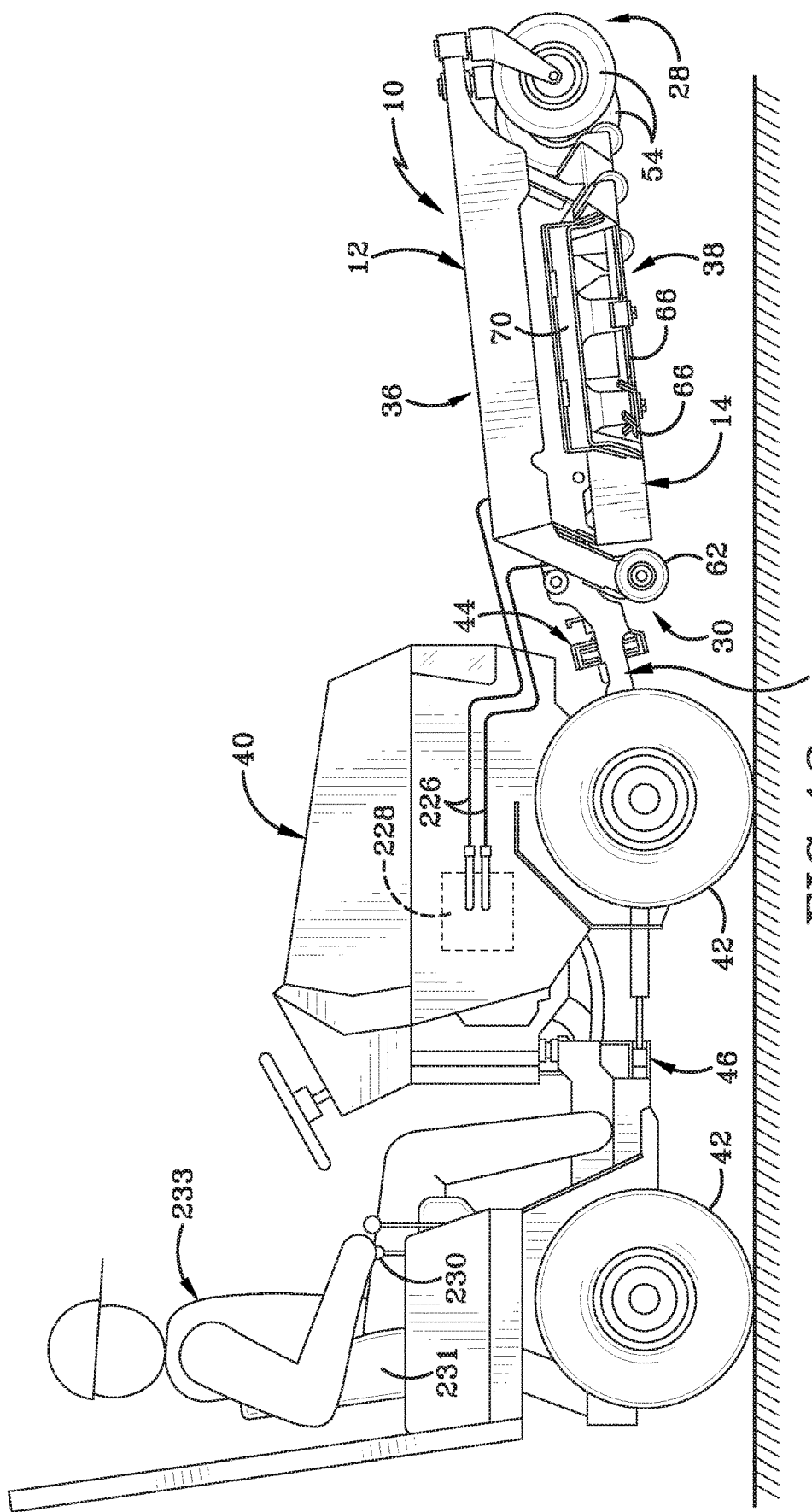
FIG. 13 is an operational side elevation view of an operator actuating a portion a hydraulic system on a tractor device so as to begin moving the mower to a generally vertical position.

FIG. 13 depicts the operator will then manipulate the other of the first and second handles, such as first handle 230, which is operatively connected with hydraulic pump 228 to cause fluid to move through lines 226. Stated otherwise, the hydraulic assembly 26 carried by the attachment (i.e., mower 10) to lift the attachment from the second position to a generally vertical third position, wherein the attachment in the third position is at a second angle in a range from about 70° to about 105° relative to horizontal is accomplished by actuating levers or elements on the tractor 40 while operator 233 is adjacent seat 231 so as to be located in a safe location away from the mower 10 or the attachment.

Figure 14:
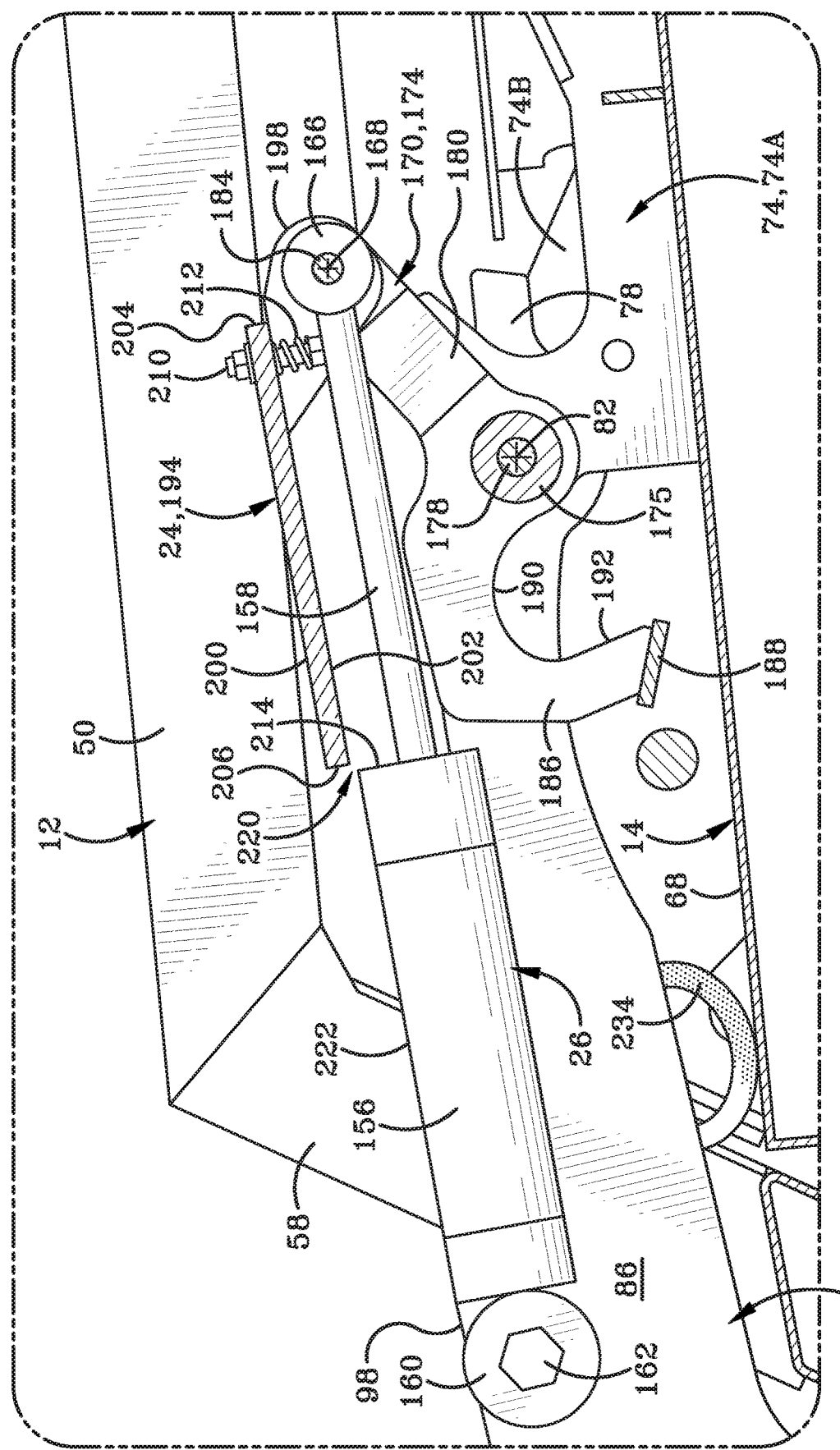
FIG. 14 is an operational longitudinal cross section of the mower in the raised and tilted position.

FIG. 14 depicts, prior to the rotation of mower 10, when the mower unit is lifted (i.e., tilted and raised in the second position or an intermediate position) in the air, the frame 14 is supported by an elastomeric stopper or bumper 234 so as to support the frame 14. The bumper 234 is connected to a bottom side of at least one hitch arm. In one particular embodiment, a bumper 234 is connected to each hitch arm 16, 18 so as to support the main frame when being suspended in the air and tilted upwardly prior to the movement of piston 158.

Figure 15:
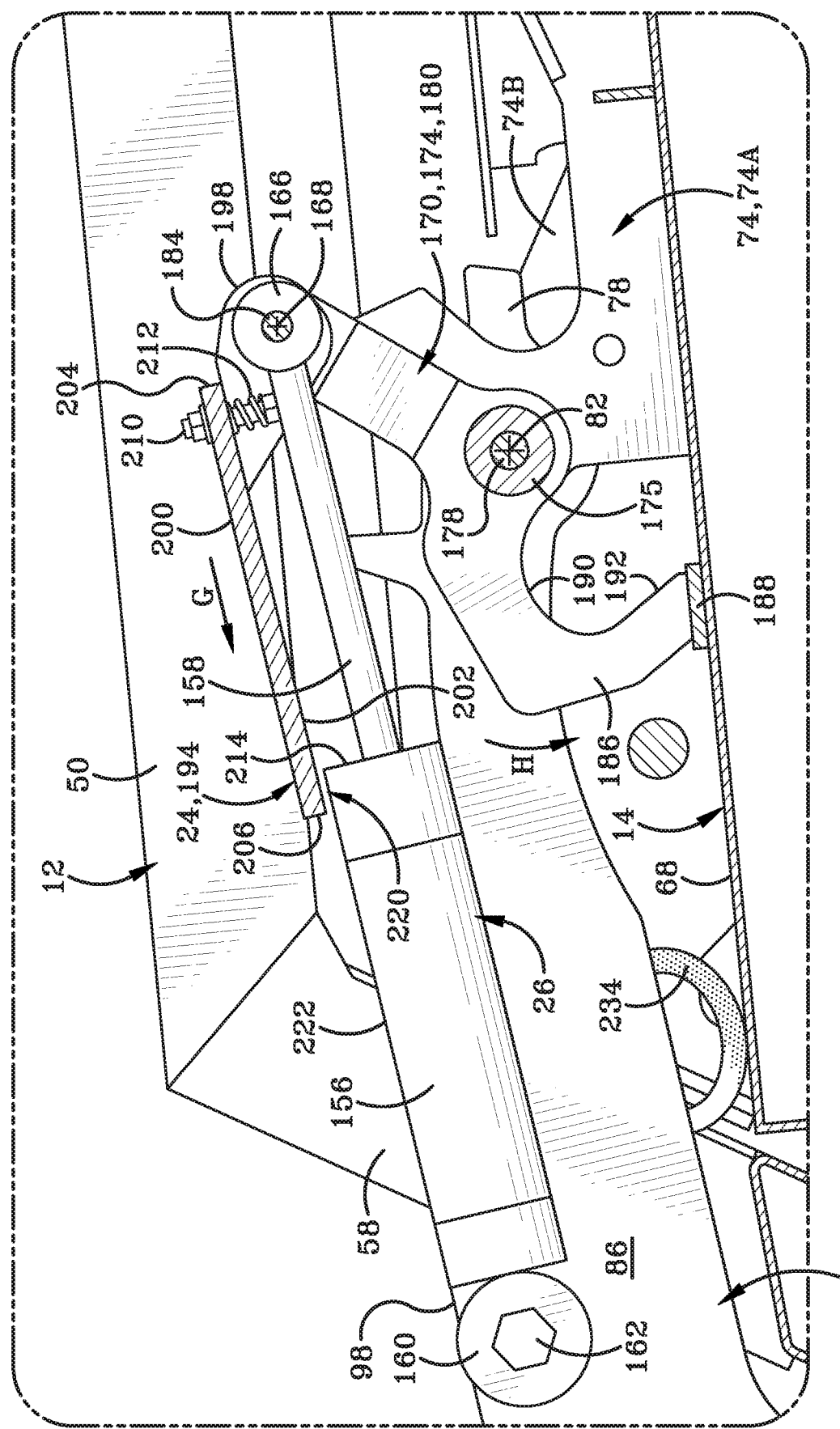
FIG. 15 is an operational longitudinal cross section of the mower retracting a piston into a hydraulic cylinder which effects the rotation of a rocker arm assembly and a portion of a lock assembly passing over the hydraulic cylinder.

FIG. 15 depicts, as hydraulic fluid moves through lines 226, which are in operative communication with the hydraulic piston and cylinder 26, the piston 158 is drawn into the cylinder 156. The linear movement of the piston 158 into the cylinder 156 is indicated by arrow G. Since plate 194 is rigidly connected with first and second legs 196, 198, which are pivotably connected with the end 166 of piston 158, the plate 194 is drawn linearly in the direction of arrow G in response to linear movement of piston 158. More particularly, the bottom surface 202 and plate 194 passes over the annular end wall 214 and passes over top surface 222 of cylinder 156. The pivotable connection at axis 168 of the bolt 184 to the rocker arm assembly 170 causes the first and second rocker arms 172, 174 to rotate about axis 82. The rotation of rocker arm assembly 170 about axis 182 is indicated by counterclockwise arrow H. As the rocker arm assembly rotates in a counterclockwise direction around as indicated by arrow H, the foot 188 on rocker arm assembly contacts the upwardly facing top surface 68 of main frame 14.

Figure 17:
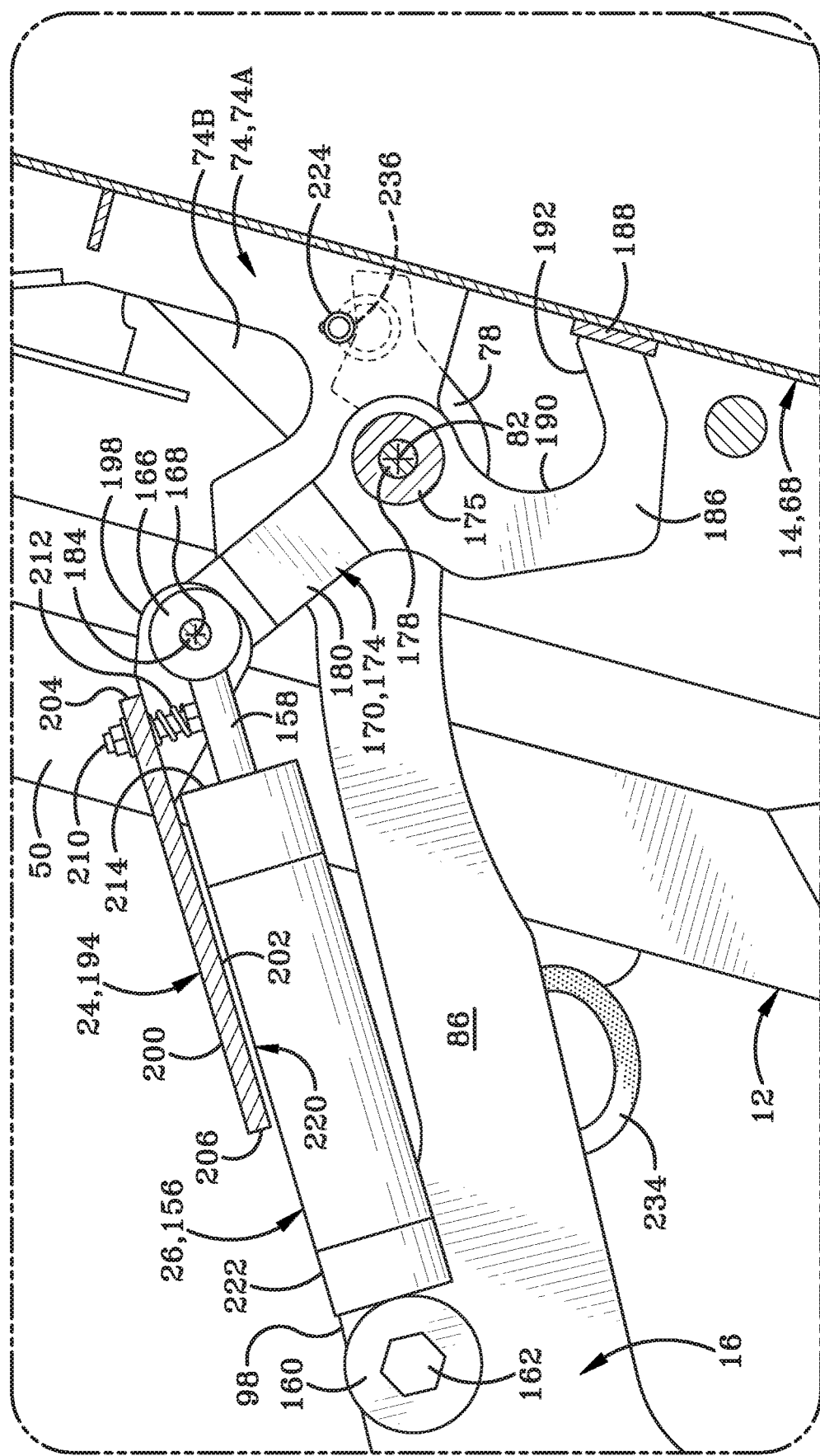
FIG. 17 is an operational longitudinal cross section view of the mower locked in the generally vertical second position.

FIG. 16 and FIG. 17 depict the piston 158 continues to be drawn into the cylinder 156 into a collapsed state. The collapsed position of piston and cylinder assembly 26 causes the rotation main frame 14 about axis 82 as indicated by arrows J in FIG. 16. During the rotation of mower 10 in the direction of arrows J about axis 82, the rear roller 60, as well as end roller 62, contacts the ground surface so as to support the mower 10 during its rotational movement in the direction of arrow J. When the mower 10 has reached the generally vertical third position (as best seen in FIG. 16), the pins 224 may be reinserted through the holes in the flanges and be supported by a seat 236 so as to lock and support the mower 10 in the upright configuration. It is contemplated that when the mower 10 is in the upright configuration, it will be easier to clean inasmuch as mowing typically causes cut grass and other debris and residue to build up on the underside of the mower where the blades 66 are operating.

In order to lower the mower 10 from the generally vertical second position to the horizontal first position, the operator will remove pins 224 and toggle or manually manipulate one of the hydraulic levers, such as first lever 230, so as to control hydraulic fluid moving through the hydraulic lines 226. The mower will rotate about axis 82 in a clockwise manner down to the second or intermediate position. The mower 10 may then be lowered via tractor hydraulic assembly 27 to the lowered position. After the mower 10 has been lowered to the substantially horizontal position, end plate 194 is locked into position by rotating the tensioner assembly about axis 152 so as to contact the handle 136 and the extension member 144 with the upwardly facing top surface 200 of plate 194. Then pin 154 may be reinstalled in the longitudinal direction through an aperture in handle 136 so as to lock the tensioner in the closed first position. The plate 194 compresses spring 212 so as to engage the end wall 206 of plate 194 with the annular end wall 214 of piston cylinder 156. The direct abutment of end 206 on plate 194 with annular end wall 214 on hydraulic cylinder 156 ensures that the piston 158 cannot be retracted into cylinder 156 due to the rigid locking nature and direct abutment of the plate 194 with the cylinder 156. Thus, the tensioner assembly 22 performs dual functions in mower 10. More particularly, mower 10 includes a tensioner assembly that is operable to adjust the tension on belt 112 which is in operative communication with the mower blades 66 and also is utilized to lock a lock assembly 24 in a locked position. Thus, the relaxation and tension of tensioner assembly 22 also disengages the lock assembly from its locked position to an unlocked position which enables the mower to be hydraulically pivoted about an axis 82 so as to raise it to a generally vertical upright position for cleaning and other maintenance or servicing.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Additionally, the generally vertical position of the mower (i.e., or generally an attachment) refers to a orientation that is in a range from about 70° to about 105° relative to horizontal ground. Furthermore, the operator 233 is able to hydraulically move the mower 10 from a safe distance, which refers to being seated upon seat 233 while rearwardly from the mower 10 during its transitional movement from the horizontal to vertical.

Additionally, the method of preforming the present disclosure may occur in a sequence different than those described herein. Accordingly, no sequence of the method should be read as a limitation unless explicitly stated. It is recognizable that performing some of the steps of the method in an different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

What is claimed:

1. A method for moving a mower frame from a generally horizontal position to a generally vertical position comprising:
   actuating an element on a tractor device in hydraulic communication with the mower frame attached to the tractor device, wherein the mower frame is positioned forwardly from the tractor device;
   effecting hydraulic fluid to move a hydraulic piston and cylinder assembly in response to actuating the element on the tractor device;
   raising the mower frame via hydraulics on the tractor device to a tilted and raised intermediate position;
   moving the mower frame between a generally horizontal position and a generally vertical position;
   pivoting the mower frame via the hydraulic piston and cylinder assembly carried by the mower frame to move the mower frame in a hands-free manner from the tilted and raised intermediate position to the generally vertical position, wherein actuating the element on the tractor occurs at a location near a seat;
   moving a portion of a tensioner assembly from a tensioned first position to a relaxed second position, wherein the tensioner assembly is carried by the mower frame and is operatively connected with mower blades via at least one belt;
   unlocking a lock assembly directly in response to the portion of the tensioner assembly moving from the tensioned first position; and
   rotating the mower frame about a first transverse axis to pivotably raise the mower frame from the generally horizontal first position to the generally vertical second position.

2. The method of claim 1, wherein rotating the mower frame about the first transverse axis is accomplished by actuating the hydraulic piston and cylinder assembly connected to the mower frame.

3. The method of claim 1, further comprising:
   pivoting a portion of a rocker arm assembly about the first transverse axis, wherein the rocker arm assembly is connected to the hydraulic piston and cylinder assembly and is connected to the mower frame.

4. The method of claim 3, further comprising:
   engaging a foot on the rocker arm assembly with the mower frame; and
   pivoting the foot around the first transverse axis to rotate the main frame about the transverse axis.

5. The method of claim 4, further comprising:
   locking the mower frame in the generally vertical position with pins selectively engaging a pin seat formed in a hitch arm pivotably connected with the mower frame at a forward end and the hitch arm connected with the tractor device at a rear end.

6. The method of claim 5, further comprising removing the pins selectively connected to a flange on the mower frame prior to moving the portion of the tensioner assembly.

7. The method of claim 2, further comprising:
   rotating a handle on the tensioner assembly about a first longitudinal axis;
   releasing the handle from a direct engagement with a lock plate on the lock assembly.

8. The method of claim 7, further comprising:
   effecting the at least one belt to be slacked in response to the handle being released from the direct engagement with the lock plate.

9. The method of claim 8, further comprising:
   relaxing a spring in response to the handle being released from the direct engagement with the lock plate, wherein the spring is operatively connected to the handle and the at least one belt.

10. The method of claim 9, further comprising:
    rotating a tension sheave wheel about a second longitudinal axis in response to the handle being released from the direct engagement with the lock plate, wherein the second longitudinal axis is offset parallel to the first longitudinal axis and the at least one belt extends around the tension sheave wheel.

11. The method of claim 2, further comprising:
    releasing an end of a lock plate on the lock assembly from a direct abutment with a portion of a hydraulic cylinder.

12. The method of claim 11, further comprising:
    urging the lock plate upwardly out of its abutment with the hydraulic cylinder;
    passing the end of the lock plate over a portion of the hydraulic cylinder in response to a piston retracting into the hydraulic cylinder.

13. The method of claim 12, further comprising:
    retracting the piston into the hydraulic cylinder to a retracted position shorter than an extended position of the hydraulic piston and cylinder assembly;
    rotating an end of the piston about a second transverse axis, wherein the end of the piston is operatively connected with a rocker arm assembly.

14. The method of claim 12, further comprising:
    rotating the rocker arm assembly around the first transverse axis in response the piston retracting relative to the hydraulic cylinder.

15. The method of claim 11, further comprising:
    establishing a gap between an end of the lock plate and the hydraulic cylinder after moving the tensioner assembly from the tensioned first position.

16. The method of claim 2, further comprising:
    raising the mower frame via lift arms on the tractor device prior to rotating the mower frame about the first transverse axis.

17. The method of claim 16, wherein rotating the mower about the first transverse axis occurs when an operator is located rearward from the mower frame.

18. A method for moving a mower frame from a generally horizontal position to a generally vertical position comprising:
    actuating at least one element on a tractor device in hydraulic communication with a mower frame attached to the tractor device, wherein the mower frame is positioned forwardly from the tractor device;
    effecting hydraulic fluid to move a first hydraulic assembly connected to the mower frame and a second hydraulic assembly on the tractor device in response to actuating the at least one element on the tractor device;

raising the mower frame via the second hydraulic assembly on the tractor device from a generally horizontal position to a tilted and raised intermediate position; and moving the mower frame from the tilted and raised intermediate position to a generally vertical position via the first hydraulic assembly connected to the mower frame.

* * * * *